United States Patent Office 3,215,713
Patented Nov. 2, 1965

3,215,713
STEROID NITRITE ESTERS
Derek H. R. Barton, Northwood, England, assignor, by mesne assignments, to Schering Corporation, Bloomfield, N.J., a corporation of New Jersey
No Drawing. Filed Mar. 14, 1961, Ser. No. 95,490
16 Claims. (Cl. 260—397.4)

This application is a continuation-in-part of my co-pending application Serial No. 19,444, filed April 4, 1960, now abandoned.

The present invention relates to a new photolytic process and to new compounds for use in such a process. More particularly, it relates to a novel and improved process for attaching substituents to the 18 to 29 carbon steroids and to other organic compounds.

The present invention has for its object the provision of a novel and improved process by which various substituents may be attached to different and selected portions of the molecule of certain organic compounds, which organic compounds are selected from the group of alcohols having a first carbon atom to which the —OH group is attached, a carbon atom adjacent said first carbon atom, another atom spaced from said first carbon atom by said adjacent carbon atom, and attached to said other atom another carbon atom to which at least one hydrogen atom is attached, said other atom being selected from the group consisting of O, S, N, and C. This group of alcohols may be symbolized by HO—C—C—X—C—H, wherein X is C, O, N, and S, said group of alcohols being further characterized by being selected from the group consisting of the heterocyclic, alicyclic (including steroids) and other cyclic alcohols, and those other alcohols which have at least six carbon atoms and another atom selected from the group consisting of O, S, N, and C. As used hereinafter, the expression "HO—C—C—X—C—H alcohols" is used to include those alcohols which are comprised within the foregoing definition.

A further object of the present invention is the provision of a novel and improved process of photolysis which is applicable to solutions of the nitrite esters of such HO—C—C—X—C—H alcohols.

The invention further provides a novel and improved process of forming many new organic compounds, many of which are new and useful in themselves, while others of the resulting compounds are steroids useful as intermediates in the production of different steroids and other organic compounds many of which have medicinal value. In many instances, the process of the present invention makes it possible to form substituted compounds which cannot be formed by conventional processes, while in other instances, the process of the present invention provides a simpler, more expedient and more economical process of forming such substituted organic compounds.

A further object of the present invention, in certain of its aspects, is the provision of a novel and highly useful series of new compounds, the nitrite esters of steroids having from 18 to 29 carbon atoms, which are characterized by being photochemically active, and by having the nitrite radical in the 1β, 2β, 4β, 6β, 7β, 11α, 11β, 15α, 18, 19, 20α 20β, or 24 position. Such nitrite steroid esters provide a series of compounds which are extremely useful as intermediates and may be photolytically reacted to produce oximes, nitroso-monomers and nitroso-dimers and in some instances, by further chemical change, nitrones.

In the process of the present invention, there is first formed the nitrite ester of a "HO—C—C—X—C—H alcohol," as by reacting such an alcohol with nitrosyl chloride in a dry non-polar solvent, such as pyridine, after which the nitrite ester is subjected to ultraviolet radiation of a wave length band from about 3000 A. to 5000 A. while the nitrite ester is dissolved in a suitable solvent. The wave lengths of the irradiation band are such that it includes activating energy, and the wave length of the ultraviolet light corresponds to at least some of the absorption bands of the nitrite radical. This activation of the nitrite radical causes the NO group to be transferred from the carbon atom to which it is linked to a conformationally adjacent carbon atom; the resultant chemical change is that NO group is exchanged with an H atom originally attached to this conformationally adjacent carbon atom. The latter carbon atom is separated from the carbon atom to which the nitrite radical is linked by two intervening carbon atoms or by a —C—X— group wherein X is O, S, or N. Thus, by irradiation and photolysis, the nitrite is transformed by rearrangement of the molecule into an oxime, a nitroso-dimer, or a nitroso-monomer, and occasionally if other functional groups are suitably placed, to a small extent to a nitrone. The oxime, nitroso-monomer and the nitroso-dimer, as well as any nitrone which is formed, may then be further reacted to form other organic compounds, such as lactones, hemi-acetals, nitriles, alcohols, aldehydes, ketones, amines, carboxylic acids, iminolactones, and many other derivatives.

The process of the present invention, in its broadest aspect involves the photolytic exchange of a hydrogen atom and a NO group within the molecule of an HO—C—C—X—C—H alcohol, the interchange being effected between the NO group and a hydrogen which are linked to separate carbon atoms, which carbon atoms are spaced from each other by two other atoms one of which is carbon while the other is oxygen, sulfur, nitrogen or carbon, the hetero-atom being more distant from the —OH group than the others of the two spacing atoms. With such an arrangement of the NO group and a hydrogen atom attached to separate carbon atoms within the molecule subjected to ultra-violet radiation of a wave band including ultra-violet energy of wave lengths corresponding to at least some of the absorption bands of the nitrite radical, the nitrite radical is activated and, when the nitrite ester is in solution, it reacts with the conformationally adjacent hydrogen atom to produce a new compound, such as a nitroso-dimer, nitroso-monomer, or an oxime thereby providing a new group of intermediates for the production of many new or difficultly obtainable end products.

As will be seen by reference to the summary in Fieser and Fieser, "Steroids" (1959), pp. 7 to 15, and the works there referred to, the atoms attached to the 11β and 18 carbon atoms are more adjacent to each other than the 11β substituents are to the hydrogen atoms attached to carbon atoms at positions 8, 9, 12 or 13. Similarly, the substituents on the 11β are closer to the hydrogen atoms on the 19-carbon atom, than they are to the other hydrogen atoms attached to the carbon atoms surrounding the 19-carbon position, that is to the hydrogen atoms attached to carbon atoms at positions 1, 5, 6, or 9.

In a similar manner, the atoms and groups linked to other carbon atoms in the steroid molecule, are conformationally adjacent to the hydrogen atoms linked to certain other carbon atoms, of which the following are the principal examples: 1β group is conformationally adjacent to hydrogen attached to 11-carbon;

2β group is conformationally adjacent to hydrogen attached to 19-carbon;

4β group is conformationally adjacent to hydrogen attached to 19-carbon;

6β group is conformationally adjacent to hydrogen attached to 19-carbon;

7β group is conformationally adjacent to hydrogen attached to 15-carbon;

11β group is conformationally adjacent to hydrogen attached to 18- and 19-carbons;
11α group is conformationally adjacent to hydrogen attached to 1-carbon;
15α group is conformationally adjacent to hydrogen attached to 7-carbon;
18 group is conformationally adjacent to hydrogen attached to 11-carbon;
19 group is conformationally adjacent to hydrogen attached to 11-carbon;
20α and 20β groups are conformationally adjacent to hydrogen attached to 18-carbon;
24 group is conformationally adjacent to hydrogen attached to 20-carbon.

In less complex compounds to be conformationally adjacent, it is usually only necessary that the photolytically active nitrite group be linked to a carbon atom of a compound having the grouping ONO—C—C—X—CH, such as 1-octanol-nitrite, (1-octyl nitrite), and the carbon holding the reactive hydrogen to be exchanged with the NO group will be found to be spaced from the carbon atom to which the NO group is attached by two intervening carbon atoms or by by two atoms —C—X— wherein X is O, N, or S, provided the carbon possessing the reactive hydrogen is saturated. Thus, in the case of 1-octyl nitrite, irradiation of the compound in a suitable solvent, will cause the NO group, at the 1-position, to be exchanged with a hydrogen attached to the 4-position. Similarly, an NO group attached to the 2-carbon in the nitrite ester of 2-octyl alcohol will react with a hydrogen atom attached to the 5-carbon atom.

After the process has been carried out, as by the formation of oxime at the 4-position from a nitrite ester having the nitrite group in the 1-position, the oxime may be converted to the corresponding alcohol, giving a 1,4-diol, which may then be re-esterified to yield the 4-nitrite ester, which may then be subjected to further photolysis in solution to yield the oxime at the 7-position, which 7-oximino compound may then be converted into the desired final product, such as a 1,4,7-triol.

The mechanism by which this photolytic rearrangement and exchange takes place is imperfectly understood at the present time, but the following model and explanation is offered, which is consistent with the facts known at the present time.

A primary, secondary, tertiary, normal or branched chain nitrite, derived from an HO—C—C—X—C—H alcohol, represented by the general Formula 1 below, and illustratively having eight carbon atoms in the molecule, is subjected to ultra-violent irradiation of a wave-band having wave-lengths in the general range of 3000 A. to 5000 A., and preferably intense bands of radiation between 3400 A. and 4000 A., which correspond to at least some of the ultraviolet absorption bands of the nitrite radical, in the solvent being used, whereupon, the NO group bonded as shown in Formula 2, is freed from the oxygen atom linking it to its original carbon atom in the molecule. The hydrogen atom on the fourth carbon atom (that is the carbon atom which is separated by two carbon atoms from the carbon atom to which the nitrite group is attached) is attacked by and thence held by the ultra-violet activated oxygen radical generated by release of the NO group as shown in Formula 3. The next page is thought to comprise the migration of the NO group to the carbon group from which the hydrogen was just released as shown in Formula 4, and which may exist as a monomer or dimer depending on the structure of the compound, and where $R_1$ or $R_2$ in the Formulae 1, 2, 3, and 4, or both of them is hydrogen, the reaction proceeds under prototropic conditions (preferably in a lower alkanol solution at reflux temperature) to the formation of the oxime (5), after which removal of one molecule of water will result in the formation of a nitrile (6) (if $R_2$ is hydrogen).

As applied to aromatic and other aryl compounds the nitrite radical, as in (7), by photolysis is rearranged to form a nitrosodimer compound, such as in (8a) which converts under prototropic conditions to the more stable isomer, the oxime (8b).

With alicyclic compounds, the nitrite group may be attached to a carbon in the ring, as at (9), and react with an available hydrogen separated from the nitrite radical by four carbon atoms (that is by two carbon atoms intervening between the carbon atoms to which the nitrite radical and reactive hydrogen are attached to give a compound such as (10a) and the isomeric oxime (10b); or, in an aromatic compound, the nitrite radical in the side chain (11) may react with a hydrogen bonded to a carbon atom in another side chain to yield (12a) and (12b).

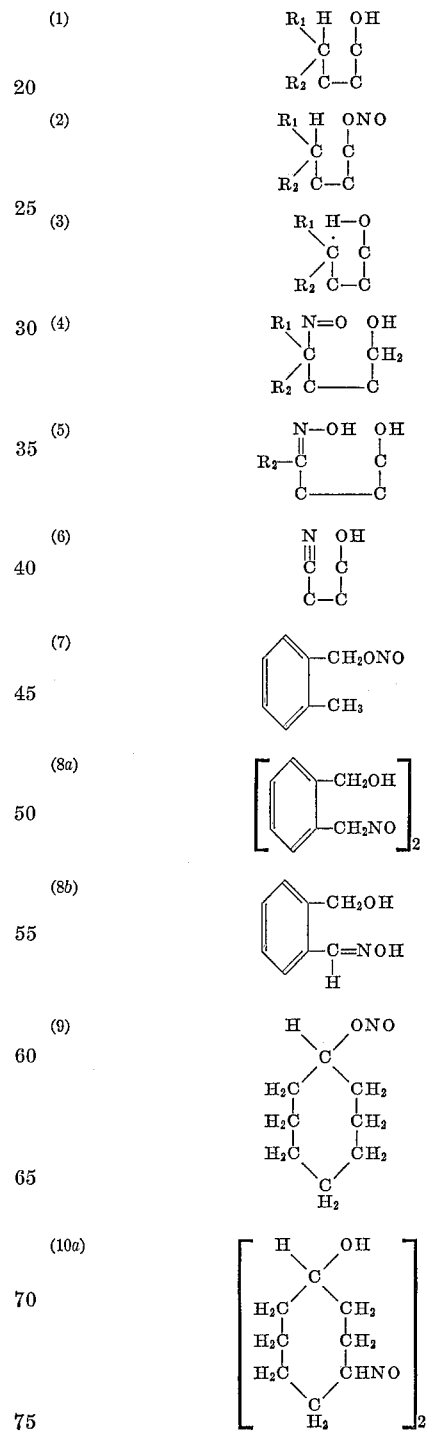

(10b)

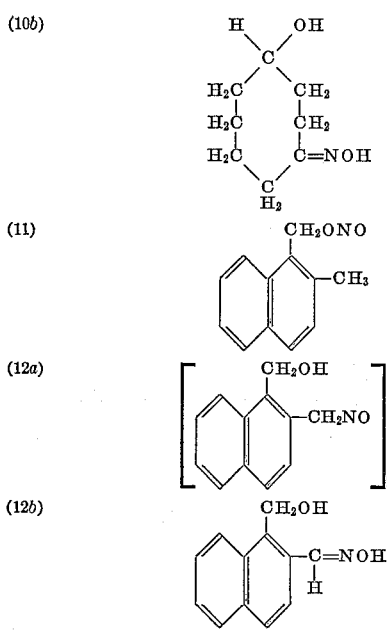

(11) (12a) (12b)

Similarly, in the heterosubstituted compounds the nitrite radical (in Compound 13) is activated by irradiation to exchange its NO group with a hydrogen suitably spaced from the nitrite-bonded carbon atom, to give the compound shown at (14).

In other heterosubstituted compounds the nitrite esters photolyze in solution to cause a transfer of the NO group from one carbon atom to the conformationally adjacent carbon atom which is the fourth carbon atom, or the fourth atom in the group HO—C—C—X—C—H, where X is oxygen, sulfur, nitrogen or carbon.

Typical of such other heterosubstituted compounds whose nitrite esters are subjected to photolysis in solution are the nitrite ester of β-diethylamino-α-phenylethyl alcohol (15) which is photolysed to form β-(ethyl-α-nitrosoethyl)amino-α-phenylethyl alcohol dimer (16a) and the isomeric oxime (16b); the nitrite ester of 1-(p-chloro-α-phenyl - benzyl) - 4-(2-hydroxyethoxyethyl)-piperazine (17) which on photolysis in solution will yield 1-(p-chloro-α-phenylbenzyl) - 4 - (2-hydroxyethoxy-β-nitrosoethyl)piperazine dimer (18a) and the isomeric 1-(p-chloro-α-phenylbenzyl) - 4-(2-hydroxyethoxy-β-oximinoethyl)piperazine (18b); and the nitrite ester of propyl-(β-hydroxy-γ-chloropropyl)sulfide (19) which on photolysis yields (α-nitrosopropyl)-(β-hydroxy-γ-chloropropyl) sulfide (20a) and the isomeric oxime (20b) (α-oximinopropyl)-(β-hydroxy-γ-chloropropyl) sulfide.

The process of the present invention now finds its greatest field of usefulness in the preparation of novel steroids, having from 18 to 29 carbon atoms, in that it provides a novel manner of general application by which substituents may be added to the steroid molecule, in positions where heretofore great difficulty has been experienced, and in many instances it provides the unique manner of providing certain substituents at certain positions.

In the process of the present invention, as it is applied to the 18 to 29 carbon steroids, there is first formed a nitrite ester having a nitrite radical in the 1, 2, 4, 5, 6, 7, 11, 15, 18, 19, 20 or 24 position, by reacting a solution of a steroid having a hydroxy group at the corresponding position in pyridine, dimethylformamide, acetic anhydride or other non-polar solvent with a nitrosyl halide, preferably nitrosyl chloride. The steroid nitrite so formed is then subjected to ultraviolet radiation which includes a band of radiation corresponding to at least some of the adsorption bands of the nitrite radical. This irradiation causes the nitrite radical to be activated so that the NO group is transferred from a carbon atom of the steroid molecule to a conformationally adjacent carbon atom spaced from the carbon to which the nitrite group is linked by two carbon atoms (as from the 11β to the 18 position), to form a compound which may then be further reacted in various ways by conventional procedures.

Many of the nitrite esters used in the process of the present invention are new and valuable intermediates, and the invention thus also comprises such novel nitrite esters, especially the nitrite esters of steroids having from 18 to 29 carbon atoms, and in which the nitrite ester is in the 1β, 2β, 4β, 6β, 7β, 11α, 11β, 15α, 18β, 19β, 20α, 20β, or 24 position. In the 2β, 4β, 6β, and 11β position, the nitrite radical is conformationally adjacent to a hydrogen attached at the 19 position. In the 1β, 18, and 19 positions, the nitrite is conformationally adjacent to a hydrogen attached to the 11 position. In the 11β, 20α and 20β positions, the nitrite is conformationally adjacent a hy-

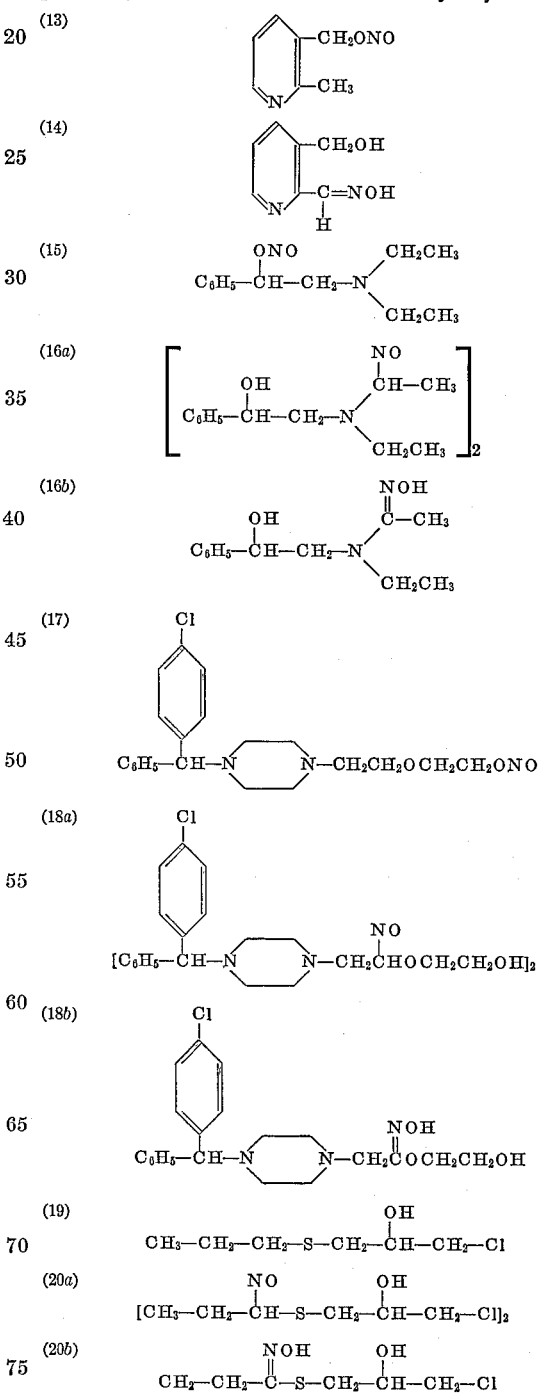

drogen in the 18 position, while in the 11α-position, the nitrite is conformationally adjacent a hydrogen in the 1-position; in the 7β-position, the nitrite is conformationally adjacent a hydrogen in the 15-position; in the 15α-position, the nitrite radical is conformationally adjacent a hydrogen in the 7-position, while in the 24 position the nitrite radical is conformationally adjacent a hydrogen in the 20 position of a steroid having from 24 to 29 carbon atoms.

The 18 to 29 carbon steroid nitrites of the present invention thus form a group of valuable and highly useful intermediates for the production of both known and hitherto unknown steroids, while the process of the present invention provides a novel method by which a variety of substituent groups may be introduced at many different positions, including the 11, 18, 19, and 20 positions into a steroid molecule having 18 to 29 carbon atoms, thereby providing a series of intermediates which serve for the formation of other compounds, many of which have heretofore been difficult to prepare, while others have been unknown and cannot be made by known or conventional processes.

Among the types of organic compounds which can be usefully employed as starting materials in the process of the present invention are the 18- to 29-carbon steroids, having a hydroxy group, such as 11β-hydroxyestrone, 11β-hydroxy-Δ4-androstene-3,17-dione, 11β-hydroxytestosterone-17-acetate, 11β-hydroxyisoandrosterone-3-acetate, cortisol acetate, corticosterone acetate, 16α-hydroxy-corticosterone acetate, 16α-methyl corticosterone acetate, 16β-methylcorticosterone acetate, 16α-hydroxy-1-dehydrocorticosterone acetate, 16α-methyl-1-dehydrocorticosterone acetate, 16β-methyl-1-dehydrocorticosterone acetate, pregnane-3α,11β,17α,20β-tetrol-3,20 diacetate, prednisolone acetate, 11β-hydroxyprogesterone acetate, 11β,17α-dihydroxyprogesterone, 16α-hydroxyprednisolone acetate, 16α-methylprednisolone acetate, 16β-methylprednisolone acetate, dexamethasone acetate, 16-epi dexamethasone acetate (Δ1,4-pregnadiene-3,20-dione-9α-fluoro-11β,17α,21-triol-16β-methyl 21 acetate), pregnane-3α,11β,20-triol 3α,20-diacetate and 11β-hydroxy cholestanol acetate.

Certain of these compounds, such as some of those having one or more additional hydroxy groups, may need preliminary protection to block some of the hydroxy groups, so that these hydroxy groups will not react with the nitrosyl halide.

While the nitrosyl chloride or nitrosyl bromide used to form the nitrite may be added to the alcohol solution in any desired manner, it is convenient slowly to add a solution of the nitrosyl chloride in the same solvent as is used to dissolve the alcohol, or alternatively, the nitrosyl chloride may be introduced as a gas into the solution of the alcohol. The solvents are preferably dry non-polar solvents, such as pyridine, acetic anhydride or dimethylformamide.

The formation of the organic nitrite is usually very rapid, and the progress of the reaction is usually observed by the resulting color of the solution, so that when the blue green or other color of the nitrosyl chloride is no longer discharged or changed by reaction with the dissolved alcohol, it can be assumed in general that the nitrite has been formed and that the compound in the solution is ready for separation and photolysis.

In the majority of the reactions within the scope of the present invention, the temperature at which the nitrite is formed is not subject to any critical range but the reactions are usually carried out at moderate temperatures, ranging from −30° to 30° C., although in certain of the reactions the yield varies when there is a departure from an optimum temperature. In general satisfactory results have been found to result from carrying out the nitrosyl chloride reactions in the neighborhood of 0° C. to 30° C. and generally at 15° C. to 20° C., although the reaction will proceed over a wide temperature range, such as −30° C. to +30° C.

After completion of the formation of the nitrite, the nitrite is separated, and this is generally accomplished by adding water to the solution to precipitate the nitrite and by subsequent filtering, followed by crystallization, and recrystallization if desired, or otherwise if the nitrite is a liquid.

Thereafter, the nitrite is dissolved in a solvent preparatory to being subjected to photolysis by ultraviolet light, although a liquid or solid nitrite ester of this invention may be photolysed per se and there will occur a transfer of the NO group with said active hydrogen according to this invention.

The ultraviolet radiation used to activate the nitrite radical so as to cause it to be transferred in part to replace the adjacent hydrogen attached to a carbon atom, is that band of radiant energy which corresponds to some or all of the ultraviolet absorption bands of the nitrite radical and is in the range from 3000 A. to 5000 A. and usually at 3400 A. to 4000 A. Such energy is conveniently supplied by a Hanovia high-pressure mercury arc lamp with a Pyrex sleeve in proximity thereto, while the nitrite to be reacted is contained in an ultraviolet transmitting receptacle, such as a water-cooled Vycor immersion well.

A variety of solvents may be used for the photolysis of the nitrite, including acetic acid, acetone, acetonitrile, benzene, carbon disulfide, carbon tetrachloride, chlorobenzene, chloroform, cyclohexane, dimethyl ether, dimethylformamide, dioxane, ethylacetate, Freon 113, heptane, methylene chloride, and toluene, of these benzene and Freon 113 yield preferred results and toluene is the most preferred. For efficient operation, the solvent is preferably chosen so as to have a high degree of transparency to ultraviolet radiation within the specified band of nitrite absorption.

While the solvents used in the photolysis are ordinarily water-free, a small amount of moisture in the solvent used for photolysis does not ordinarily interfere with the progress of the ultraviolet activation and rearrangement of the nitrite in accordance with the present invention.

During the course of the photolysis of a nitrite ester, a stream of nitrogen or other inert gas is generally bubbled through the solution, but it is not always necessary to keep the nitrite solution protected by an inert atmosphere.

The photolysis of the nitrite ester which is carried on by irradiation with the selected band of ultraviolet radiation is monitored from time to time by infra-red spectrophotometry of an aliquot, and the reaction is complete when the infra-red absorption spectra lack the characteristic spectra of the nitrite grouping.

The products of the nitrite photolysis are variously treated, and such subsequent steps may include chromatography, fractional crystallization, and by further reactions to convert the photolysed nitrite ester into a nitrile, iminolactone, lactone, hemiacetal, alcohol, carboxylic acid, or otherwise.

Among the various ultimate products which may be prepared from the steroid nitrites by the process of the present invention, with added conventional steps, are the lactones, linked at 2 and 19, at 4 and 19, at 6 and 19, at 11 and 18, at 11 and 19, at 18 and 20, and at 24 and 27, the corresponding hemi-acetals substituted at the 2, 4, 6, 11, 18, 19, 20, or 24 position and a wide variety of other substituents at these positions.

Depending upon the exact conformation of the steroid nitrite (having 18 to 29 carbon atoms) involved and used during the photolytic process of the present invention, photolysis procedes with the transfer of the NO group of the nitrite grouping from one carbon atom to an adjacent carbon atom with the formation of an oxime or a nitroso-monomer or nitroso-dimer. While the exact mechanism of the photolytic reaction has not yet been fully established, it appears to involve several intermediate steps, but in all instances the process of the present invention involves the shifting of a nitrogen atom to another carbon atom which is spaced from the original carbon atom to which the nitrogen was linked by two other carbon atoms, e.g., as the C–11 carbon is separated from the C–18 carbon atom by two intervening carbon atoms C–12 and C–13.

It will be understood that the foregoing general description and the following detailed description as well are exemplary and explanatory of the invention but are not restrictive thereof.

In a manner similar to that described for the various foregoing preparations, the other hydroxy steroids having 18 to 29 carbon atoms, and constituting the estrogen, androgen, methyltestosterone, pregnane, cardiac aglycone, bile acid, cholesterol, ergosterol and stigmasterol series, may be reacted with a nitrosyl halide to form the corresponding nitrite esters.

Where there is more than one hydroxy group subjected to the formation of a nitrite ester by treatment with nitrosyl halide, such as the 16α-hydroxy group, it may be advantageous to start with a 16α-acylated compound which lacks the 11β-hydroxy group to treat this compound microbiologically, as with *Curvularia lunata* (N.R.R.L. No. 2380) to produce the 11β-hydroxy group to be subjected to the formation of the 11β-nitrite ester. After photolysis, the 16α-acylate may be removed to give the 16α-hydroxy group.

Among the many steroid compounds having 18 to 29 carbons which may be nitrited to form nitrite esters are those having substituents or modification of the basic cyclopentanoperhydrophenanthrene ring structure.

Thus in the estrogens having 18 carbon atoms in the ring structure, at position 6, there may be substituted a halogen or a methyl group; at position 9 there may be an α-fluorine, or other halogen; at position 16, there may be an α-hydroxyl group; at position 17, there may be an α-hydroxyl group or an acetoxy group; at position 18, there may be an aldehyde, a methyl group, a hydroxyl group, a carboxyl group, an amino-methyl group, or a cyanide group.

Additionally, in the androgens, having 19 carbon atoms in the ring structure, there may be a double bond from positions 1 to 2, and/or from 4 to 5.

In the pregnane series, having 21 carbon atoms, in addition to the various substitutions and modifications set forth above, there may be additional substitutions of a hydroxyl or an acetate, butyrate or other carboxylate radical at the 21 position.

In the sterols, having 27 to 29 carbon atoms similar, usual substitutions may be made in the A, B, C, and D rings, or in the side chain.

The various nitrite esters of the 18 to 29 carbon series of steroids may be photolysed by irradiation in solution with ultra-violet light to form the corresponding oximes and nitrosomonomers or dimers by interaction with an available or reactive hydrogen atom in a conformationally adjacent position; that is, a nitrite radical at the 11β position may react with an available hydrogen atom in the 18 or 19 positions; a 2β, 4β or 6β nitrite may react with an available hydrogen in the 19 position; a 1β, 18 or 19 nitrite with hydrogen in the 11 position; a 20α or 20β nitrite with a hydrogen in the 18 position; an 11α-nitrite with hydrogen in the 1 position; a 7β-nitrite with hydrogen in the 15-position; a 15α-nitrite with a hydrogen in the 7 position; and a 24 nitrite with a hydrogen in the 20 position. These oximes, and nitroso dimers, and monomers so produced may thereafter be reacted by conventional steps to produce the corresponding hemiacetals, nitriles, aldehydes, lactones, alcohols, carboxylic acids, carboxylates, as well as other derivatives, all of which have variously modified therapeutic properties with respect to their parent steroid compounds. In many instances, the properties are greatly enhanced with respect to the parent compounds, while in other instances the properties are greatly different, and in a few instances, the properties are antagonistic with respect to the properties of the parent compound. The immediate and ultimate products of the photolysis of the nitrite in accordance with the present invention have an exceedingly wide range of utility. Many of them are useful without further treatment after photolysis, while others may be modified to achieve their greatest present usefulness. When modified, they are useful as improved therapeutic agents, as intermediates providing new and more economical routes to known and to hitherto unknown compounds, as detergents, as perfume substances, as bacteriostats, and many other uses, some of which are hereinafter set forth in detail.

In general, the oxime is the most stable derivative obtained by photolysis, the isomeric nitroso derivative always being formed first and, under prototropic conditions, converted to the oxime. When steroidal nitrite esters (e.g., the 11β-nitrite ester of 16β-methyl-prednisolone acetate) are photolysed and the photolysed product is immediately subjected to separation, as by chromatography, an oxime (e.g., 18-oximino-16β-methyl-prednisolone acetate), is usually recovered with a small amount of the isomeric nitroso-dimer being present. Alternatively alkyl nitrite esters (e.g., 1-octanol nitrite) upon photolysis and immediate separation of the photolysed product preferentially yields the nitroso-dimer (e.g., 4-nitroso-1-octanol-dimer) with a small amount of oxime (e.g., 4-oximino-1 octanol) being present. In the latter case, the nitroso-dimer converts under prototropic conditions to the more stable isomeric form, the oxime. This conversion takes place in the photolysed solution on long standing or may more rapidly be effected by warming the nitroso compound at moderate temperatures, usually in the range of 50–125° C., either alone or in solution and preferentially in a refluxing solution of a lower alkanol such as methanol, ethanol, propanol, and the like. When the photolytic exchange of an NO with a hydrogen atom within the molecule of an HO–C–C–X–CH alcohol, produces a tertiary nitroso derivative, there is usually formed a nitroso-monomer. For example the nitrite ester of 3-cyclohexyl-1-propanol upon photolysis according to the process of this invention, yields the nitroso-monomer, 3(1-nitroso-1-cyclohexyl)-1-propanol. While the oxime, nitroso-dimer and nitroso-monomer are usually formed by the photolytic process, in a few instances there is some subsequent formation of a nitrone.

The solvents for use in the photolysis are chosen primarily on the basis of their ability to dissolve the steroid nitrite ester to be photolysed, and to a lesser extent upon the facility with which they may be removed by evaporation at moderate temperatures, so that the oximes, nitroso dimers or nitrones may be recovered as crystals without being subjected to a higher degree of heat than is necessary, which would tend to cause decomposition or deterioration of the photolytic products.

Thus, those solvents providing good solubility for the steroid products to be photolysed are preferred, and those having the additional characteristics of a relatively high molecular weight and a relatively low boiling point are the most desired. For this reason toluene is preferred above the other solvents, although benzene and Freon 113 are almost as advantageous. Among the many other solvents which may be used are acetone, acetonitrile, carbon disulfide, carbon tetrachloride, chloroform, chlorobenzene, cyclohexane, dimethyl ether, dimethylformamide, dioxane, ethyl acetate, heptane, methanol, methylene chloride, and xylene.

Any source of ultraviolet light which provides a strong radiation from about 2000 A. to 5000 A. is suitable, especially in the band from 3400 A. to 4000 A., and a mercury arc lamp, such as the 200 watt Hanovia mercury lamp is suitable, although larger lamps would be needed for economical production on a larger scale. The nitrile solution to be irradiated is preferably contained within a water-cooled immersion well which is substantially transparent to ultraviolet light of the specified wave-lengths, and for small quantities a water-cooled Vycor immersion well is preferred.

Other sources of irradiation which may be used in the novel process of this invention are high energy irradiations such as X-rays, gamma-rays and the like.

To eliminate excessive heating of the nitrite during photolysis, the solution being irradiated is preferably surrounded by a filter which eliminates the non-actinic rays which could serve only to heat the solution. Thus, a sleeve of Pyrex glass is preferably provided around the solution undergoing photolysis.

After about 20 minutes of irradiation, in most instances, the photolytic product begins to precipitate from solution, and completion of the photolytic reaction can often be judged by visual examination of the volume of the precipitate, but for more careful control and a more accurate determination of the completion of the photolytic reaction, aliquot samples of the solution undergoing photolysis may be subjected to monitoring by periodic examination of their infra-red absorption spectra to determine the extent to which the nitrite ester has been activated and transformed into the desired reaction products. Conveniently, it is usually necessary only to examine the aliquot sample to determine the remaining quantity of nitrite ester, due to the difference which is readily apparent between the infra-red absorption spectra of the nitrite and the absorption spectra of the oximes, nitroso-dimers and nitrones.

In general, the photolysis of the organic nitrite esters is substantially complete after about 1 hour of irradiation under the conditions generally specified in toluene solution, at about 30° C., when irradiated by a 200 watt mercury arc lamp. This time may vary widely due to the difference in actual absorbed ultraviolet energy activating the dissolved nitrite.

The foregoing general description of the process of the present invention, and of the new compounds comprised in the present invention will now be illustrated by reference to a wide variety of specific working examples in which the nitrite esters are photolysed or transformed photochemically into other compounds which may be further treated to yield ultimate useful products.

Steroid nitrites according to the present invention may be prepared from the corresponding alcohols, and the following specific examples are typical of the preparation of steroid nitrites according to the present invention and for subsequent photolysis.

PREPARATION NO. E-1

11β-hydroxyestrone (E1a) is readily converted to the 3 acetate (E1b) and then to 11β-nitrite of estrone by dissolving 3.0 g. of the 11β-hydroxyestrone, by conventional process of acetylating the 3-hydroxy group, as by treatment with an excess of acetic anhydride, and by evaporating the acetic anhydride in vacuo. Thereafter the 11β-hydroxy estrone 3 acetate (E1b) is dissolved in 100 ml. of pyridine, and there is slowly added to the solution while stirring about 80 ml. of a 1% solution of nitrosyl chloride in pyridine. The addition is preferably made dropwise while the solutions are at a temperature of approximately −10° C., and the addition is continued until the color of the solution remains unchanged by further additions of the nitrosyl chloride solution. After standing for an hour, the 11β-nitrite of estrone (E1c) may be precipitated from solution by the addition of water to the solution, and the 11β-nitrite may then be recovered by filtration.

PREPARATION NO. E-2

The 11β-nitrite ester of estradiol (E2c) may be formed in exactly the same manner as set forth in Preparation No. E-1, except that 11β-hydroxyestradiol (E2a) is first acetylated at C-3 and C-17, and is then treated with nitrosyl chloride to form the 11β-hydroxy nitrite ester of estradiol 3,17-diacetate (E2b).

(E-1a)
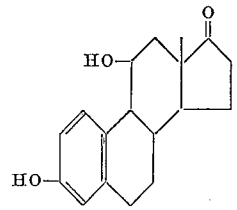

(E-1b)
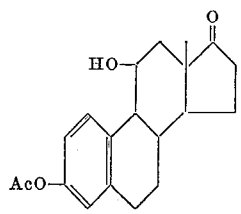

(E-1c)
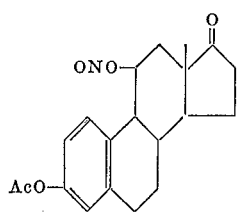

(E-2a)
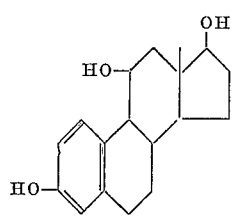

(E-2b)
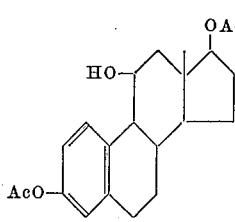

(E-2c)
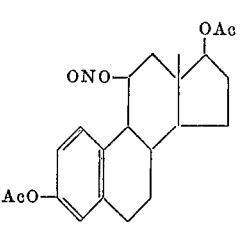

PREPARATION NO. E-3

A solution of 2.5 g. of 11β-hydroxy-Δ⁴-androstene-3, 17-dione (E-3a) in 100 ml. of dimethylformamide, cooled to about −25° C. is titrated with about 50 ml. of a 1% solution of nitrosyl chloride in pyridine until the color of the solution remains substantially unchanged. After an hour, the 11β-nitrite of hydroxyandrostenedione (E-3b) is precipitated by the addition of water, and the 11β-nitrite may be recovered by filtering.

(E-3a)
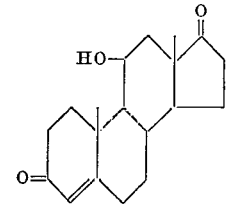

(E-3b)

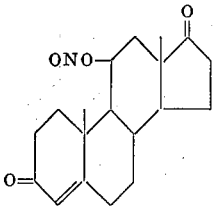

PREPARATION NO. E-4

A stirred solution of 2.7 g. of 11β-hydroxytestosterone-17-acetate (E-4a) dissolved in 100 ml. of dry pyridine and cooled to about 0° C. or lower, is treated with nitrosyl chloride by slowly adding about 50 ml. of a 1% solution in dry pyridine until a dark blue or green color persists in the mixed solutions. After about 5 minutes, water is added to the reaction mixture to precipitate the product and to decompose any residual nitrosyl chloride. Filtration of the crystalline solid and recrystallization from methylene chloride gives the 11β-nitrite ester of testosterone-17-acetate (E-4b) as crystalline white needles.

(E-4a)

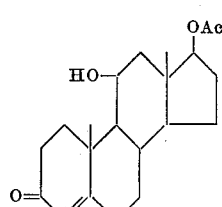

(E-4b)

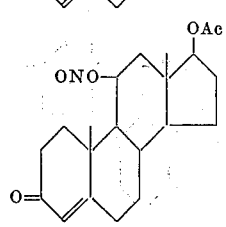

PREPARATION NO. E-5

A solution of 3.0 g. of 11β-hydroxyisoandrosterone-3-acetate (E-5a) in 100 ml. of dry pyridine cooled to about −20° C. is constantly stirred while nitrosyl chloride is allowed to distill into the steroid solution until the color of the nitrosyl chloride persists. Thereafter, water is added to precipitate the 11β-nitrite ester of androsterone-3-acetate (E-5b) formed by the reaction of the nitrosyl chloride with the 11β-hydroxy steroid. The crystalline precipitate is then filtered, the filtrate washed, and dissolved in and recrystallized from a volatile solvent, such as methanol, methylene chloride or hexane.

(E-5a)

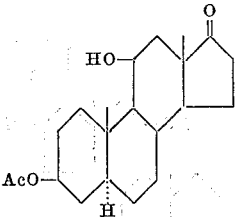

(E-5b)

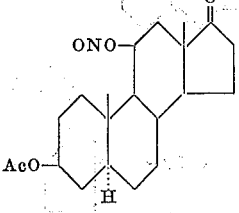

PREPARATION NO. E-6

The 20-carbon compound, 11β-hydroxy-17α-methyl testosterone acetate (E-6a) is converted into the corresponding 11β-nitrite (E-6b) by reacting it in dry pyridine 1% solution at about 30° C. with a 1% solution of nitrosyl chloride in dry pyridine, the addition being made slowly with stirring and continuing until the color of the solution remains unchanged. The 11β-nitrite ester is recovered after 30 to 60 minutes by water precipitation, filtering and washing.

(E-6a)

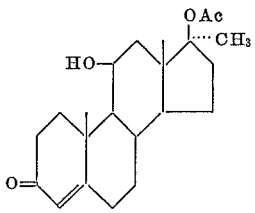

(E-6b)

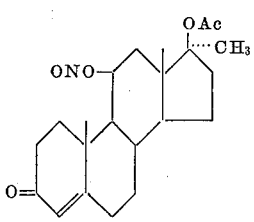

PREPARATION NO. E-7

A 2.00 g. sample of 6β-hydroxy-3β,21-diacetoxy-20-keto-5α-pregnane (E-7a) in 200 ml. of pyridine at −30° C. is treated with an excess of nitrosyl chloride in pyridine solution and can be water-precipitated as a white solid which is recovered by filtering. It may then be recrystallized from hexane to give a white crystalline material, which is 3β,21 - diacetoxy-20-keto-5α-pregnane-6β-nitrite (E-7b).

(E-7a)

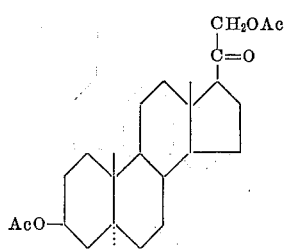

(E-7b)

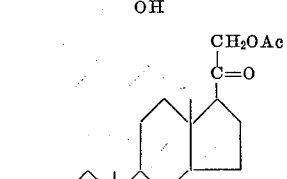

PREPARATION NO. E-8

The 11β-nitrite of cortisol acetate (E-8a) is readily formed in essentially quantitative yield by titrating a 1% solution of nitrosyl chloride into a solution of 4.0 g. of cortisol acetate (E-8a) dissolved in 100 ml. of dry pyridine, the solution being cooled to about 0° C., and the nitrosyl chloride being added while the solution is stirred. The addition of the nitrosyl chloride is continued until the blue-green color of the solution remains substantially unchanged. Thereafter, the 11β-nitrite ester of cortisol acetate is precipitated from the pyridine solution by the addition of water, and the nitrite is recovered by filtration. On recrystallisation from a volatile solvent such as methylene chloride, the cortisol acetate 11β-nitrite (E-8b) is a crystalline product.

(E-8a) 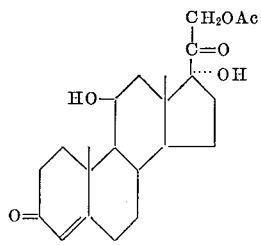

(E-8b) 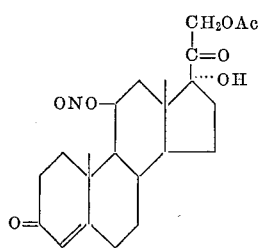

(E-11a) 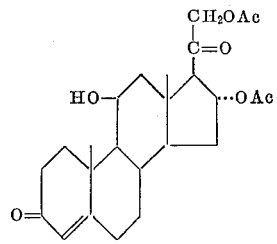

(E-11b) 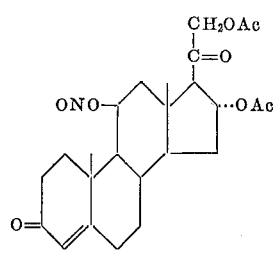

PREPARATION NO. E-9

Dissolve 3.0 g. of corticosterone acetate (E-9a) in 100 ml. of dimethylformamide and cool to −10° C. While stirring, 55 ml. of a 1% solution of nitrosyl chloride in dimethylformamide is slowly added until the color of the solution remains substantially constant. The solution is allowed to stand for an hour or more and the 11β-nitrite ester (E-9b) is precipitated from the solution by the addition of water to the mixture. The precipitate is then recovered by filtration, washed with water and may be purified by recrystallization from a solvent such as methylene chloride. The resulting product is the 11β-nitrite ester of corticosterone acetate.

PREPARATION NO. E-12

16α-methyl corticosterone acetate (E-12a) is subjected to exactly the same treatment as is set forth with respect to Preparation No. E-11.

(E-9a) 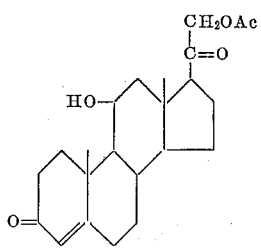

(E-12a) 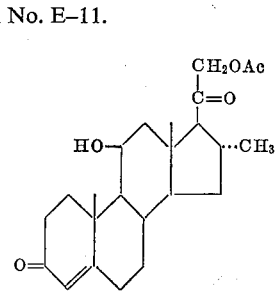

(E-9b) 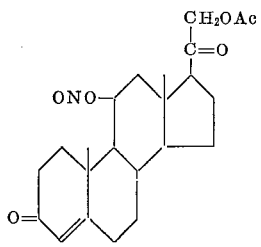

(E-12b) 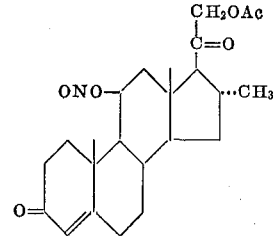

PREPARATION NO. E-10

In exactly the same manner as set forth in Preparation No. E-9, the 11β-nitrite ester of corticosterone acetate may be prepared using about 85 ml. of a 1% solution of nitrosyl bromide in place of the nitrosyl chloride solution.

PREPARATION E-13

PREPARATION NO. E-11

A stirred solution of 2.5 g. of 16α-hydroxycorticosteronediacetate (E-11a) dissolved in 100 ml. of dry pyridine and cooled to about −20° C. is treated with nitrosyl chloride by slowly adding about 45 ml. of a 1% solution in dry pyridine until a dark blue or green color persists in the mixed solutions. After about 5 minutes, water is added to the reaction mixture to precipitate the product and to decompose any residual nitrosyl chloride. Filtration of the crystalline solid and recrystallization from methylene chloride gives the 11β-nitrite ester of 16α-acetoxycorticosterone acetate (E-11b).

(E-13a) 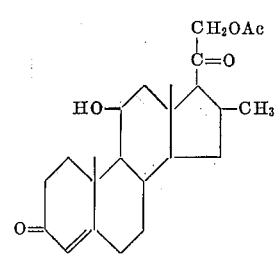

(E-13b) 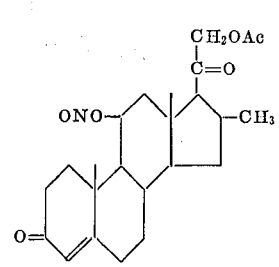

PREPARATION NO. E-19

In exactly the same manner as set forth in preparation No. E-18, the 11β-nitrite ester of prednisolone acetate may be prepared using about 100 ml. of a 1% solution of nitrosyl bromide in place of the nitrosyl chloride solution.

PREPARATION NO. E-20

A stirred solution of 3.6 g. of 11β-17α-dihydroxyprogesterone 17-acetate (E-20a) dissolved in 100 ml. of dry pyridine and cooled to about —30° C. is treated with nitrosyl chloride by slowly adding about 75 ml. of a 1% solution in dry pyridine until a dark blue or green color persists in the mixed solutions. After about 5 minutes, water is added to the reaction mixture to precipitate the product and to decompose any residual nitrosyl chloride. Filtration of the crystalline solid and recrystallization from methylene chloride-hexane gives the 11β-nitrite ester of (E-20b) 17α-hydroxyprogesterone acetate.

(E-20a)

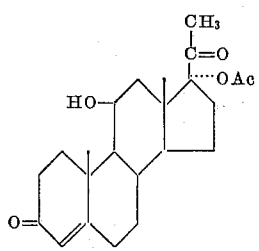

(E-20b)

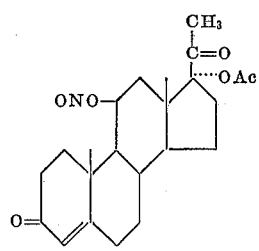

PREPARATION NO. E-21

A solution of 4 g. of 11β-hydroxyprogesterone (E-21a) in 100 ml. of dry pyridine cooled to about —20° C. is constantly stirred while nitrosyl chloride is allowed to distill into the steroid solution until the color of the nitrosyl chloride persists. Thereafter, water is added to precipitate the 11β-nitrite ester of progesterone (E-21b) formed by the reaction of the nitrosyl chloride with the 11β-hydroxy steroid. The crystalline precipitate is then filtered, washed, and dissolved in and recrystallized from a volatile solvent, such as methanol, methylene chloride or hexane.

(E-21a)

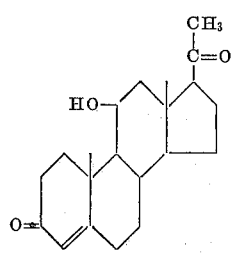

(E-21b)

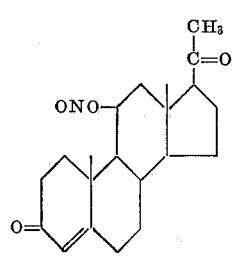

PREPARATION NO. E-22

The 11β-nitrite of 16α-hydroxyprednisolone diacetate (E-22c) is readily formed in essentially quantitative yield by first acetylating 16α-hydroxyprednisolone (E-22a) to block the 16α-hydroxy group, after which the acetylated product, 16α-hydroxyprednisolone diacetate (E-22b), is reacted by titrating a 1% solution of nitrosyl chloride into a solution of 3.0 g. of 16α-hydroxyprednisolone diacetate dissolved in 100 ml. of dry pyridine, the solution being cooled to about —5° C., and the nitrosyl chloride being added while the solution is stirred. The addition of the nitrosyl chloride is continued until the blue-green color of the solution remains substantially unchanged. Thereafter, the 11β-nitrite ester (E-22c) of acetylated 16α-hydroxyprednisolone acetate is precipitated from the pyridine solution by the addition of water, and the nitrite is recovered by filtration.

(E-22a)

(E-22b)

(E-22c)

PREPARATION NO. E-23

Dissolve 3.0 g. of the 22 carbon steroid, 16α-methylprednisolone acetate (E-23a) in 100 ml. of dimethyl formamide and cool to —10° C. to —25° C. While stirring, add 55 ml. of a 1% solution of nitrosyl chloride in dimethyl formamide slowly until the color of the solution remains substantially constant. The solution is allowed to stand for an hour or more and the 11β-nitrite ester is precipitated from the solution by the addition of water to the mixture. The precipitate is then recovered by filtration, and may be purified by recrystallization from a solvent such as methylene chloride. The resulting product is the 11β-nitrite ester of a 16α-methylprednisolone acetate.

(E-23a)

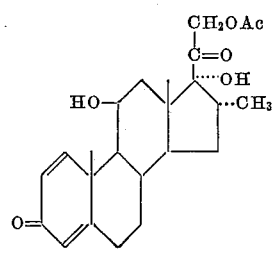

PREPARATION E-14

(E-14a)
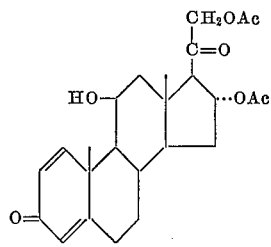

(E-14b)
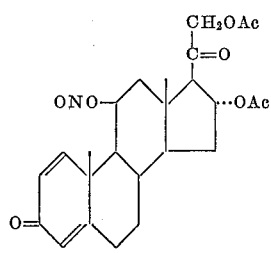

PREPARATION E-15

(E-15a)
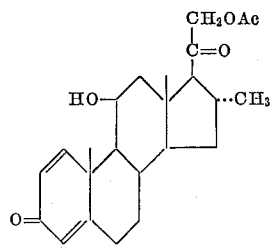

(E-15b)
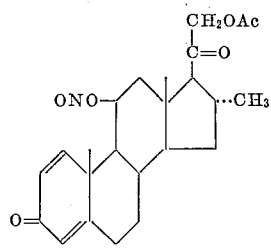

PREPARATIONS NOS. E-13, E-14, E-15 AND E-16

Similarly, 16β-methyl corticosterone acetate (E–13a), 16α-hydroxy-1-dehydrocorticosterone-16,21-diacetate (E–14a), 16α-methyl-1-dehydrocorticosterone acetate (E–15a) and 16β-methyl-1-dehydrocorticosterone acetate (E–16a) may be subjected to treatments identical with that of Preparation No. E–11, to yield the respective 11β-nitrite esters.

(E-16a)
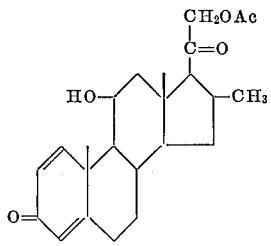

(E-16b)
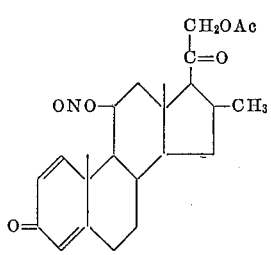

PREPARATION E-17

A solution of 2.5 g. of pregnane-3α-11β-17α-20β-tetrol, 3,20-diacetate (E–17a) in 100 ml. of dry pyridine cooled to about −20° C. is constantly stirred while nitrosyl chloride is allowed to distill into the steroid solution until the color of the nitrosyl chloride persists. Thereafter, water is added to precipitate the 11β-nitrite ester of pregnane-3α,11β,17α,20β-tetrol, 3,20-diacetate (E–17b) formed by the reaction of the nitrosyl chloride with the 11β-hydroxy steroid. The crystalline precipitate is then filtered, the filtrate washed, and dissolved in and recrystallized from a volatile solvent, such as methanol, methylene chloride or hexane.

(E-17a)
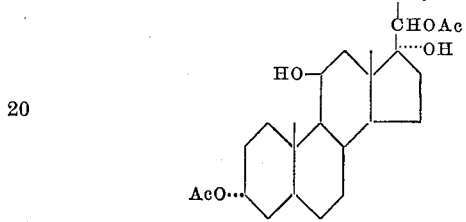

(E-17b)
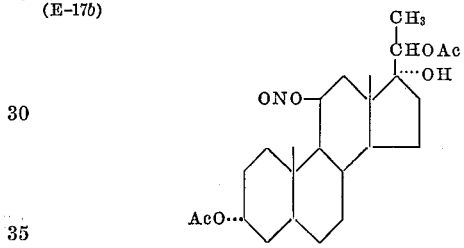

(Pregnane-3α,11β,17α,20β-tetrol 3,20-diacetate requires no preliminary acetylation to block the hydroxy group at 17α-position, as the 17α-hydroxyl group is relatively inactive with respect to nitrosyl chloride nitriting.)

PREPARATION NO. E-18

Dissolve 3.0 g. of prednisolone acetate (E–18a) in 100 ml. of dimethylformamide and cool to −10° to −25° C. While stirring, add 60 ml. of a 1% solution of nitrosyl chloride in dimethyl formamide slowly until the color of the solution remains substantially constant. The solution is allowed to stand for an hour or more and the 11β-nitrite ester (E–18b) is precipitated from the solution by the addition of water to the mixture. The precipitate is then recovered by filtration, and may be purified by recrystallization from a solvent such as methylene chloride. The resulting product is the 11β-nitrite ester of prednisolone acetate.

(E-18a)
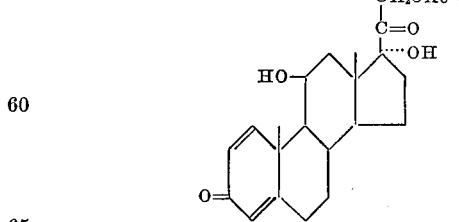

(E-18b)
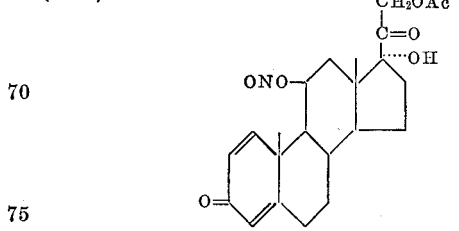

(E-23b)

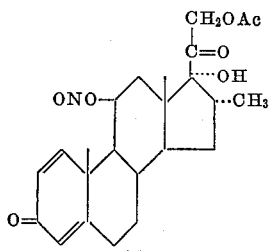

PREPARATION NO. E-24

In exactly the same manner as set forth in Preparation No. E-18, the 11β-nitrite ester of 16β-methylprednisolone acetate (E-24b) may be prepared starting with a solution of 16β-methylprednisolone acetate (E-24a).

(E-24a)

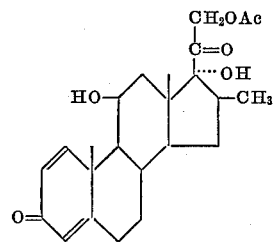

(E-24b)

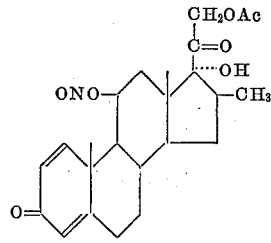

PREPARATION NO. E-25

A stirred solution of 3.0 g. of dexamethasone 21 acetate (E-25a) dissolved in 100 ml. of dry pyridine and cooled to about −20° C. is treated with nitrosyl chloride by slowly adding about 50 ml. of a 1% solution in dry pyridine until a dark blue or green color persists in the mixed solutions. After about 5 minutes, water is added to the reaction mixture to precipitate the product and to decompose any residual nitrosyl chloride. Filtration of the crystalline solid and recrystallization from methylene chloride gives the 11β-nitrite ester of dexomethasone 21 acetate (E-25b), i.e., 9α fluoro-16α-methyl-Δ¹,⁴-pregnadiene-3,20-dione-11β,17α,21-triol 11-nitrite 21-acetate.

(E-25a)

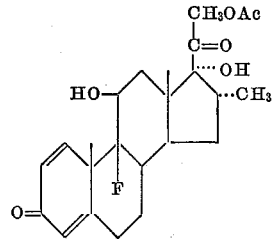

(E-25b)

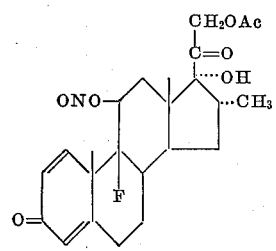

PREPARATION NO. E-26

In exactly the same manner as recited for Preparation No. E-25, one may form 9α-fluoro-16β-methyl-Δ¹,⁴-pregnadiene-3,20-dione-11β-17α,21-triol 11-nitrite 21-acetate (E-26b) from the 16β-methyl isomer of dexamethasone acetate (E-26a).

(E-26a)

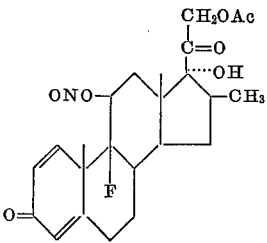

(E-26b)

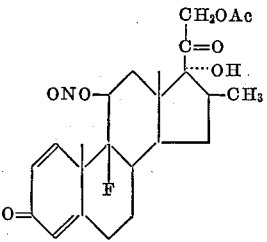

PREPARATION NO. E-27

A solution of 3.0 g. of pregnane 3α,11β,20β-triol-3,20-diacetate (E-27a) in 100 ml. of dry pyridine cooled to about −20° C. is constantly stirred while nitrosyl chloride is allowed to distill into the steroid solution until the color of the nitrosyl chloride persists. Thereafter, water is added to precipitate the 11β-nitrite ester of pregnane-3α, 11β,20β-triol-3,20-diacetate (E-27b) formed by the reaction of the nitrosyl chloride with the 11β-hydroxy steroid. The crystalline precipitate is then filtered, washed, and dissolved in and recrystallized from a volatile solvent, such as methanol, methylene chloride or hexane.

(E-27a)

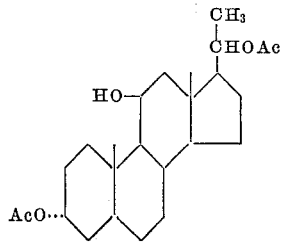

(E-27b)

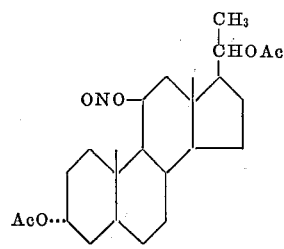

PREPARATION NO. E-28

The 11β-nitrite of 11β-hydroxycholestanol 3 acetate (E-28a) is readily formed in essentially quantitative yield by titrating a 1% solution of nitrosyl chloride into a solution of 3.3 g. of 11β-hydroxycholestanol 3 acetate dissolved in 100 ml. of dry pyridine, the solution being cooled to about −15° C., and the nitrosyl chloride being added while the solution is stirred. The addition of the nitrosyl chloride is continued until the blue-green color of the solution remains substantially unchanged. Thereafter, the 11β-nitrite ester of cholestanol 3 acetate (E-28b) is precipitated from the pyridine solution by the addition of water, and the nitrite is recovered by filtration. On recrystallization from a volatile solvent such as methylene chloride, the cholestanol 3 acetate 11β-nitrite is a crystalline product.

(E-28a)

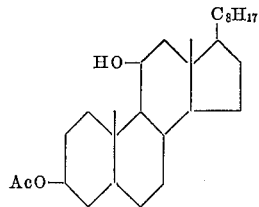

(E-28b)

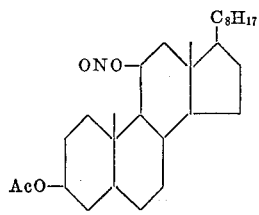

PREPARATION NO. E-29

A 1% solution of cortisol acetate oxide (E-29a) in dry pyridine is reacted with slowly added nitrosyl chloride dissolved in pyridine at from 0° to 20° C. using an excess of nitrosyl chloride, and after standing, the 11β-nitrite ester of cortisol acetate oxide (E-29b) is separated by water precipitation, filtering and washing.

(E-29a)

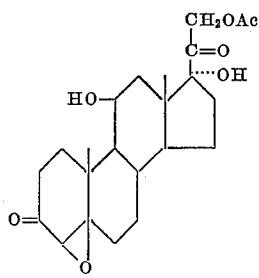

(E-29b)

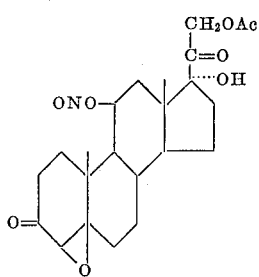

PREPARATION NO. E-30

11β-hydroxy-Δ⁴-androstene-3,17-dione is first treated with perphthalic acid to form 11β-hydroxy-Δ⁴-androstene-3,17-dione-4,5-oxide (E-30a), which is then reacted in pyridine solution at about 0° C. to form the 11β-nitrite ester (E-30b), which can be recovered by precipitation of the ester from solution by additions of water, followed by filtration.

(E-30a)

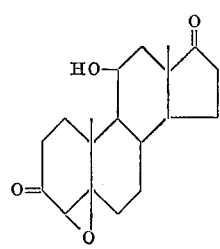

(E-30b)

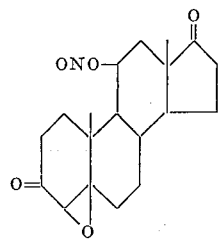

PREPARATION NO. E-31

Similarly, 4,5-oxido-dihydrocorticosterone acetate (E-31a) is prepared by treatment of corticosterone acetate with perphthalic acid, after which treatment in pyridine with an excess of nitrosyl chloride yields the 11β-nitrite ester (E-31b) of the steroid, which may then be separated and recovered by precipitation and filtering.

(E-31a)

(E-31b)

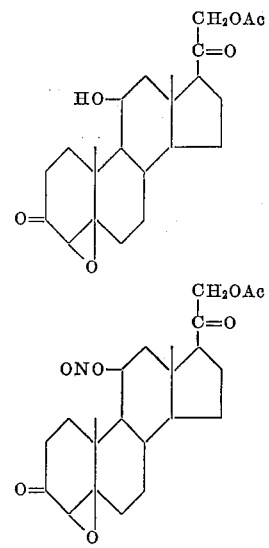

PREPARATION NO. E-32

2.3 grams of 20β-hydroxy-Δ⁴-pregnen-3-one (E-32a) in 16 ml. of pyridine at −30° C. moisture free, is reacted while stirring with dropwise additions of a 20% solution of nitrosyl chloride in dry pyridine. Each drop is decolorized until all of the alcohol has been reacted at which time, the addition of another drop of nitrosyl chloride solution causes the reaction mixture to remain blue. Stirring is continued for several minutes, after which the reaction may be quenched by the addition of 170 ml. of ice water, thereby precipitating the Δ⁴-pregnen-3-one-20β-nitrite (E-32b) which is filtered and washed with water and dried.

(E-32a)

(E-32b)

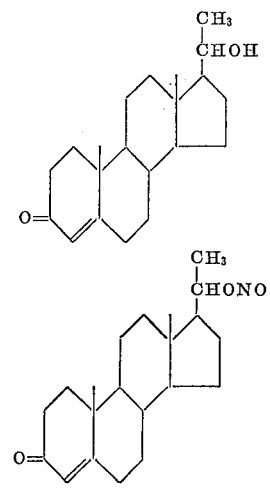

PREPARATION NO. E-33

The 23 carbon, strophanthiodol 3-acetate (E-33a) may be converted into 19-nitrate ester (E-33b) by treatment with an equimolar nitrosyl chloride in the same manner as for Preparations E-8 or E-32.

(E-33a)

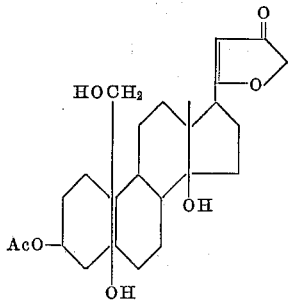

(E33b)

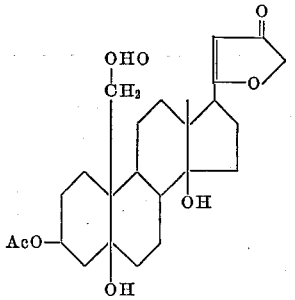

PREPARATION NO. E-34

The 24 carbon, 3α-hydroxy-11-ketocholanic acid (E-34a) may be used to form the 24-nitrite ester by subjecting the acid to conventional lithium-aluminum hydride reduction to form the corresponding 3α-11β-24-triol (E-34b) which is then acetylated to form the 3,24-diacetate (E-34c), followed by half-hydrolyzation to leave the 3-acetate-11β-24-diol, which is then subjected, in pyridine solution to treatment with a slight excess of nitrosyl chloride to form the 3α-acetoxy-11β-hydroxy-cholane-24-nitrite (E-34d). The nitrite ester is then recovered according to the procedures set forth above for other nitrite esters.

(E-34a)

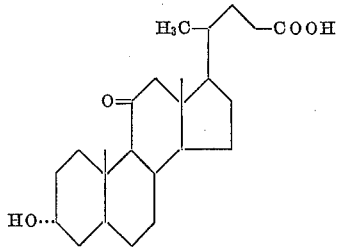

(E-34b)

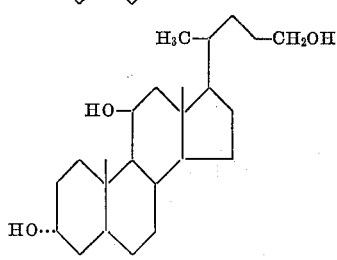

(E-34c)

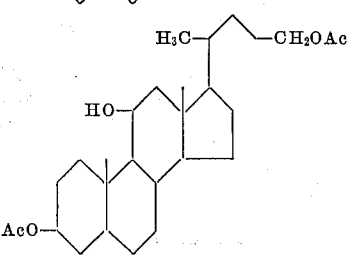

(E-34d)

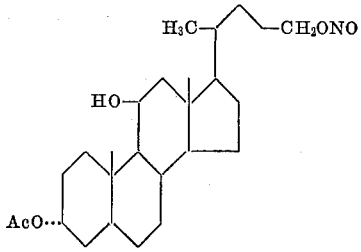

PREPARATION NO. E-35

Desmethyloxocholesterol (E-35a) may first be subjected to hypobromite oxidation to yield the 25 carbon, homo-3-epilithochol-5-enoic acid (E-35b) which is then processed as for the conversion of cholesterol acetate into 3β-acetoxy cholestan-6β-ol nitrite (E-35d).

(E-35a)

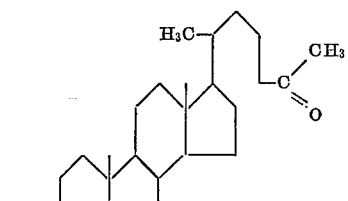

(E-35b)

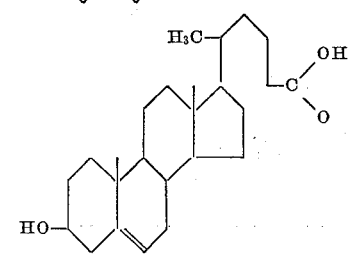

(E-35c)

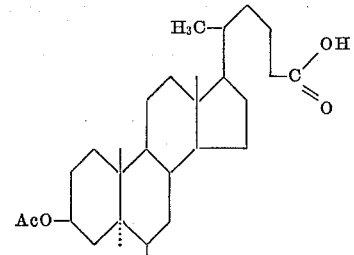

(E-35d)

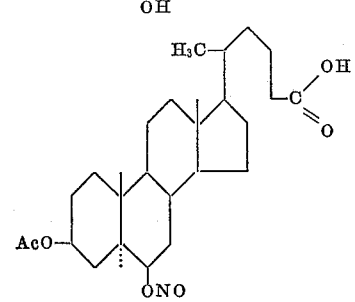

PREPARATION NO. E-36

Desmethyloxocholesterol (E-35a) may also be used as the starting material for the formation of a 26-carbon nitrite ester in which case desmethyloxocholesterol is first subjected to a Wolff-Kischner reduction to rid it of the keto radical at the 25 position, thereby forming the 26-carbon, 26-nor-cholesterol (E-36b). This substance is converted into 6β-hydroxy-26-nor-cholestan-3β-yl acetate (E-36c) which is then dissolved in pyridine and treated with an excess of a pyridine solution of nitrosyl chloride, thereby yielding the 6β-nitrite este of 26-nor-cholestanol (E-36d).

(E-36b)
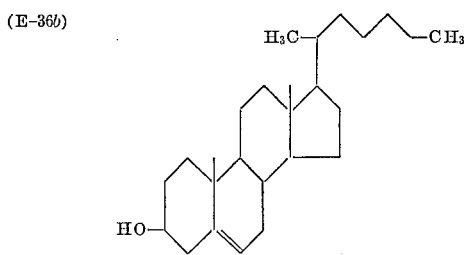

(E-36c)
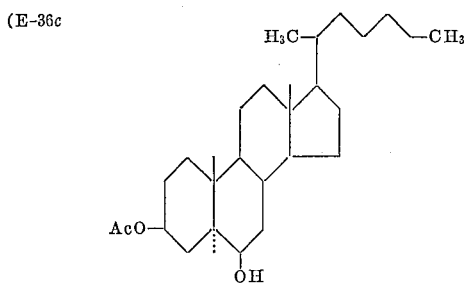

(E-36d)
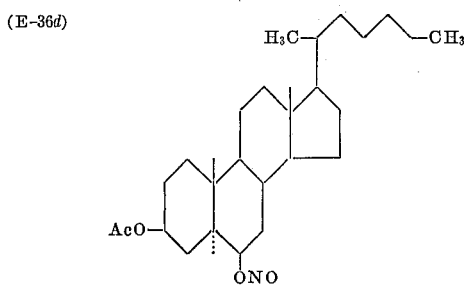

PREPARATION NO. E-37

3-acetoxy-6β-hydroxy cholestane (E-37a) may be reacted with nitrosyl chloride to form the nitrite ester (E-37b) under the same conditions as set forth above.

(E-37a)
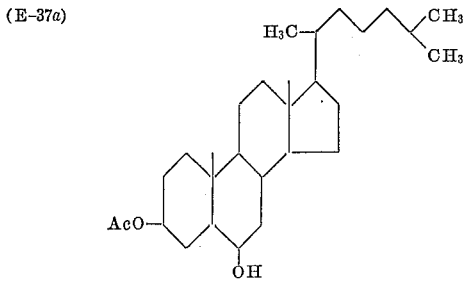

(E-37b)
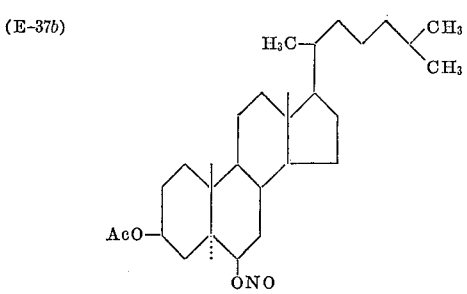

PREPARATION NO. E-38

11β-hydroxyergost-22-ene-3β-ol-3-acetate (E-38a) may likewise be treated with nitrosyl chloride to form the 11β-nitrite (E-38b).

(E-38a)

(E-38b)

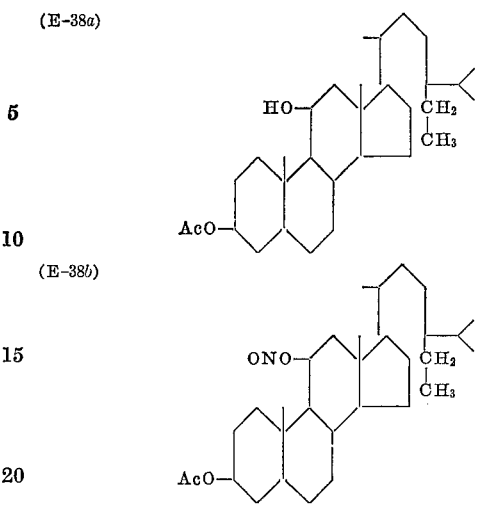

PREPARATION NO. E-39

Ergosterol (E-39a) itself may be reacted to form a nitrite by first acetylating it at the 3 position by conventional treatment with acetic anhydride (E-39b), following by treatment with perphthalic acid to give Δ$^{7,22}$-ergostadiene-3β-5α-6β-triol 3 acetate (E-39c) which is similarly reacted with nitrosyl chloride to form the 6β-nitrite. (E-39d).

(E-39a)
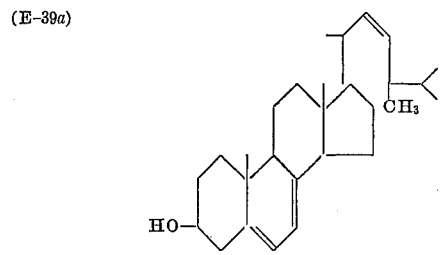

(E-39b)
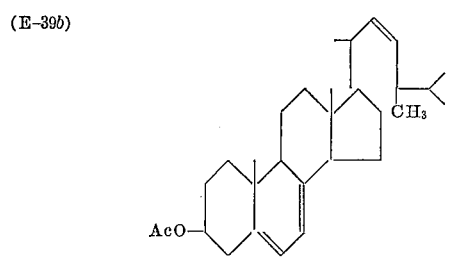

(E-39c)
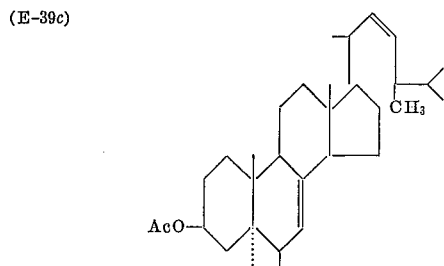

(E-39d)
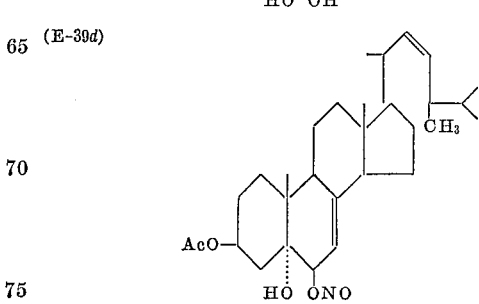

PREPARATION NO. E-40

An example of the formation of a nitrite ester of a 29 carbon steroid is found in the treatment of stigmasterol (E–40a) which is first acetylated to yield stigmasterol acetate (E–40b) which is nitrated by treatment with fuming nitric acid after which the nitro compound (E–40c) is reduced with zinc dust in the presence of water to form 6-ketostigmast-22-enyl acetate (E–40d). Reduction with sodium borohydride in ethanol-tetrahydrofuran solution yields 6β-hydroxystigmast-22-enyl acetate. This product may then be formed into the 6β nitrite ester by treatment in pyridine solution with nitrosyl chloride.

(E–40a)
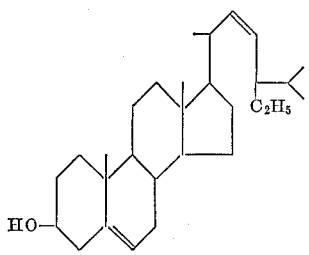

(E–40b)
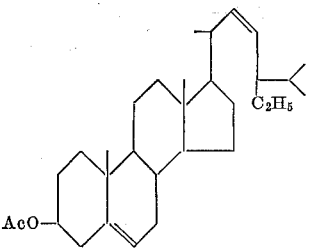

(E–40c)
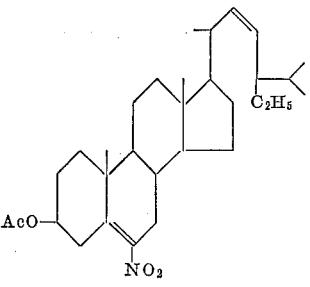

(E–40d)
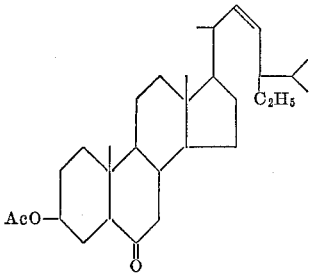

(E–40e)
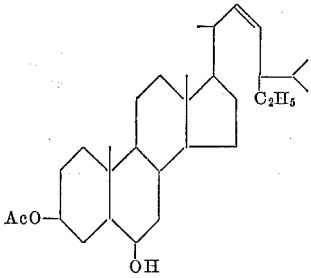

(E–40f)
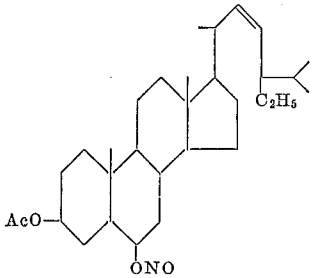

PREPARATION NO. E-41

The nitrite ester of 2β-hydroxy-cholestanyl acetate is formed when 2β-hydroxycholestanyl acetate is reacted with nitrosyl chloride in pyridine solution at room temperature or at lower temperatures. The procedure may be the same as has been set forth above in connection with Preparation No. E-8, for instance.

(E–41a)
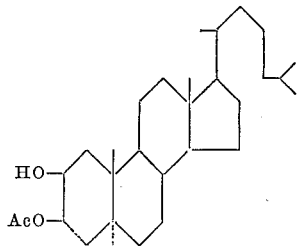

(E–41b)
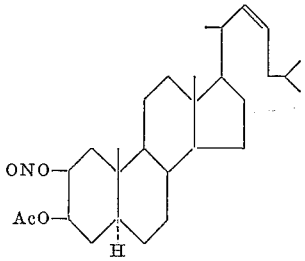

PREPARATION NO. E-42

In the identical manner, the nitrite ester of 4β-hydroxycholesteryl acetate may be formed starting with 4β-hydroxy-cholesteryl acetate in place of 2β-hydroxy-cholestanyl acetate.

(E–42a)
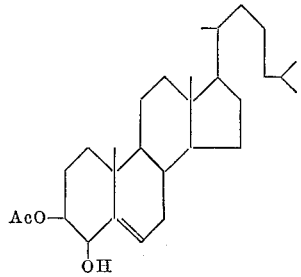

(E–42b)
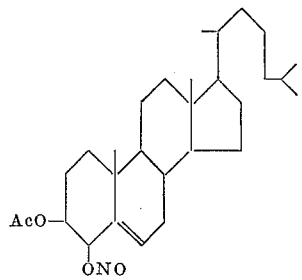

PREPARATION NO. E-43

Isorubijervine is first converted to the 3-acetate by treatment with acetic anhydride, after which the nitrite ester may be formed at the 18 position by treatment of the 3-acetate with nitrosyl chloride in pyridine solution, followed by precipitation filtration and washing, yielding isorubijervine-3-acetate-18-nitrite.

(E-43a)
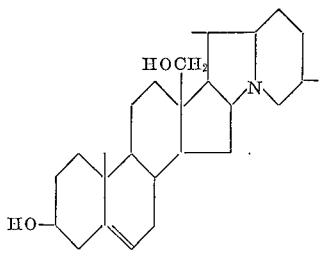

(E-43b)
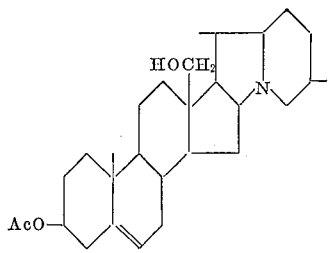

(E-43c)
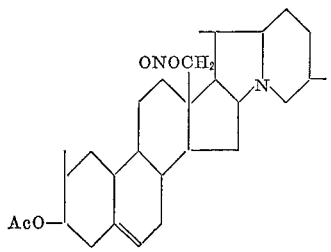

The various compounds set forth above may be photolyzed and further converted into various other intermediates and final compounds in accordance with the general procedures set forth above, and more specifically set forth below.

*Photolysis Example E-1*

The 11β-nitrite of estrone (E-1b) resulting from Preparation No. E-1, is dissolved to form a 2% solution in toluene, and is irradiated at a temperature of from 15 to 40° C., preferably at about 30° C., for a period of 30 to 60 minutes, the solution being agitated by bubbling nitrogen through it. The preferable form of the apparatus employed for the irradiation is that set forth above and comprises the 200 watt Hanovia high-pressure mercury arc lamp, provided with a Pyrex sleeve, with the solution contained in an ultra-violet transmitting receptacle, such as a water-cooled Vycor immersion well. The nitrite in solution is thus subjected to ultra-violet radiation from 3000 A. to 4500 A., especially in the band of 3400 A. to 400 A. During the irradiation, the progress of the photolysis is monitored by infra-red spectral observation of the absorption bands of a small sample of the photolysed mixture so as to determine when the characteristic absorption spectrum of the nitrite radical has substantially disappeared.

The photolysed solution comprises 3-acetoxy-11β-hydroxy-18-oximinoestrone (E-1c) which may be purified by chromatography after the toluene solvent has been evaporated by bubbling air through the solution or by boiling under reduced pressure. For the chromatographic separation, the column may be filled with Florosil, and the elution may be carried out using ether-benzene mixtures containing increasing quantities of ether; the oxime being eluted when the concentration of the ether in the developing solvent reaches beyond about 30%. Thereafter, the solvent fractions containing the 18-oxime may be evaporated to yield crystals of the 18-oxime, after which the 18-oxime may be purified by recrystallization from ethyl acetate and then from ethyl alcohol.

The purified 18-oxime (E-1c) may then be converted to the corresponding hemiacetal (E-1d) by dissolving it in about 10 times its weight of glacial acetic acid, after which there is added about one-fourth volume of a 5% solution of sodium nitrite. Gas is evolved, and after shaking for a few minutes white crystals separate, which may be purified by recrystallization from a suitable solvent, such as methanol.

The 11-18 hemiacetal of estrone-3-acetate exhibits enhanced estrogenic physiological activity, resulting in proliferation of endometrium, inhibition of pituitary follicular stimulating hormones and lowers serum cholesterol. It usually exhibits greater activity when given orally, than when administered parenterally.

(E-1c)
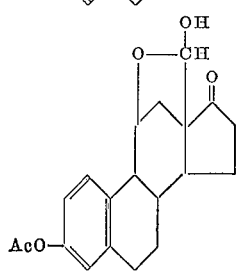

(E-1d)
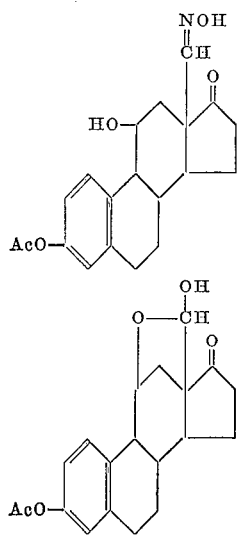

*Photolysis Example E-2*

The 11β-nitrite ester of estradiol-3,17-diacetate (E-2b) may be similarly photolysed to yield the corresponding oxime (E-2c), which may then be converted to estradiol-3-17-diacetate-11-18 hemiacetal. When purified by recrystallization from methanol, it exhibits much the same properties as does estrone-3-acetate-11-18 hemiacetal, but is somewhat more active therapeutically than is estrone-3-acetate-11-18 hemiacetal (E-1d).

(E-2c)
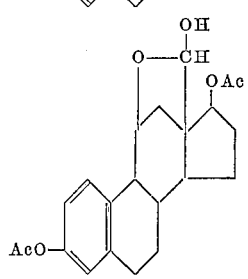

(E-2d)
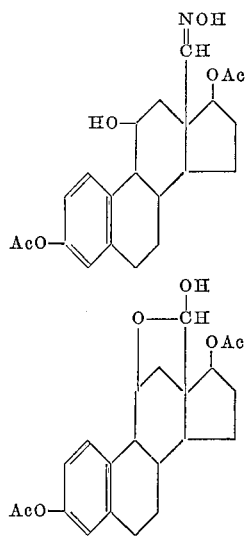

*Photolysis Example E-3*

Δ⁴-androstene-3-17-dione - 11β - nitrite (E-3b) may be converted to the corresponding 18-oxime compound (E-2c) by following the procedure given in Photolysis Example E-1, and may then be converted to the 11-18 hemicetal by the subsequent steps set forth above, and purified by recrystallization from methanol.

(E-3c)

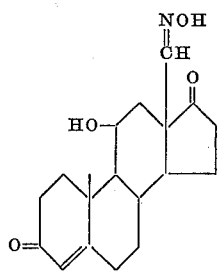

(E-3d)

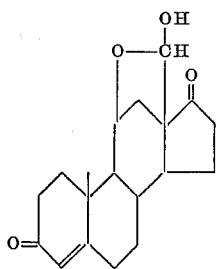

Δ⁴-androstene-3-17-dione-11-18 hemiacetal (E-3d) exhibits enhanced androgenic activity with respect to 11β-hydroxy-Δ⁴-androstene-3-17-dione, as well as enhanced anabolic activity, and is useful in promoting a positive calcium balance in osteoporosis. It may be effectively administered orally, as compared with 11β-hydroxy-Δ⁴-androstene - 3 - 17 - dione which is substantially inactive when given orally.

*Photolysis Example E-4*

The 11β-nitrite ester of testosterone-17-acetate (E-4b) when treated in accordance with Example E-1, yields the photolytic product, 11β-hydroxy-18-oximinotestosterone-17-acetate (E-4c) which may be further converted to 11β-hydroxy-18-aminotestosterone-17-acetate by conventional treatment with lithium-aluminum hydride followed by reoxidation with manganese dioxide.

If desired the 18-amino compound (E-4d) may be further reacted to convert it into the corresponding quaternary ammonium salt (E-4e) which is useful as a sympatholytic agent acting by ganglionic neural transmission, and which is also useful as an anti-spasmodic. The 18-amino compound may be converted to the quaternary ammonium salt by treating the 18-amino compound with methyl iodide and with mild heat.

(E-4c)

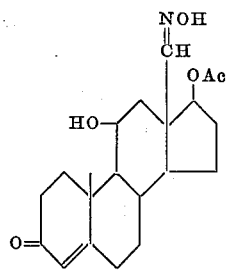

(E-4d)

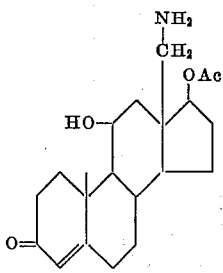

(E-4e)

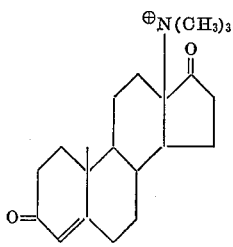

*Photolysis Example E-5*

A 1% solution of androsterone-3-acetate-11β-nitrite (E-5b) in Freon 113, irradiated by ultraviolet light under the conditions specified in Example E-1 for a period of about 1 hour yields a product which comprises the 18 oxime of androsterone-3-acetate (E-5c), which can be purified and separated by recrystallization, and the 19-oxime of androsterone-3-acetate which is isolated by means of chromatographic techniques.

The parent compound 11β-hydroxy androsterone-3-acetate (E-5a) is a weak androgen, while the androsterone-11-18-hemiacetal-3-acetate (E-5d) lowers the serum cholesterol when administered intramuscularly. The androsterone-11-18-hemiacetal may be prepared from the photolytically produced oxime (E-5b) by means of nitrous acid followed by mild alkali treatment, such as aqueous sodium carbonate.

(E-5c)

(E-5d)

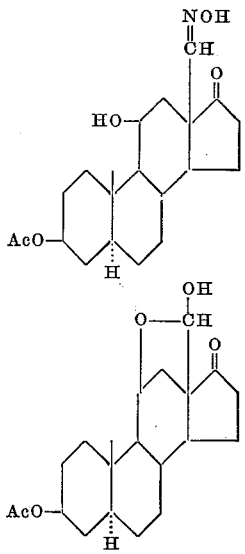

*Photolysis Example E-6*

From the preparation No. E-6 is derived 17α-methyl-testosterone-acetate-11β-nitrite (E-6b) which is subjected to photolysis according to the procedure set forth in Example E-1, by which there is produced the 18-oxime compound (E-6c). By reaction with aqueous sodium nitrite in glacial acetic acid solution, this 18-oxime is converted into the 11-18-hemiacetal (E-6d). When recrystallized from methanol or other suitable solvent it has the same general properties as 17α-methyl testosterone acetate, but with enhanced androgenic activity, and it also has the property of inhibiting pituitary follicular stimulating hormones in the human system.

(E-6c)

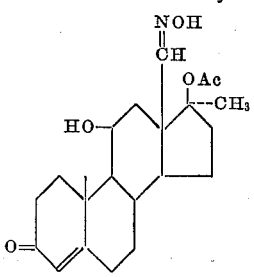

(E-6d) 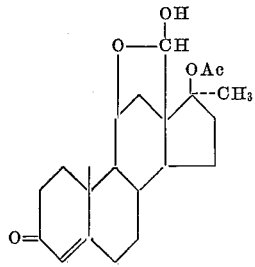

*Photolysis Example E-7*

The 6β-nitrite of 3β, 21-diacetoxy-20-keto-5α-pregnane (E-7b) dissolved in toluene to form a 3% solution is photolysed under the conditions given above for one hour. After photolysis, the solution is allowed to stand for several hours, and a very small amount of iso-propyl alcohol is added to the solution to convert any nitroso-dimer to the oxime. The solid precipitate was dissolved in methylene chloride and was chromatographed on a Florosil column, which was then eluted with successive portions of methylene chloride-acetone, the successive portions containing increasing amounts of acetone, the 19-oxime (E-7c) being found in the intermediate fractions of the eluate. Thereafter, the 19-oxime is recrystallized from acetonitrile and is then ready for further treatment.

The 19-oxime (E-7c) is then dissolved in glacial acetic acid to which is slowly added a dilute aqueous solution of sodium nitrite, thereby forming 6,19-hemiacetal of 3β,6β,21-trihydroxy-20-keto - pregn-19-al - 3,21-diacetate (E-7d), which may be purified by recrystallization from methanol-acetonitrile.

(E-7c) 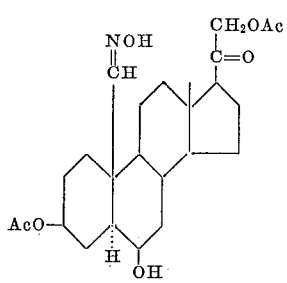

(E-7d) 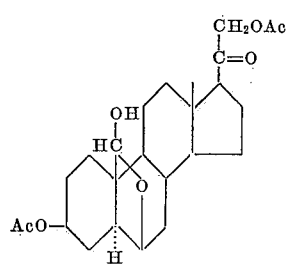

*Photolysis Example E-8*

Under conditions identical with those of Example E-1, a 1% solution of cortisol acetate 11β-nitrite (E-8b) prepared according to Preparation E-8, yields the 18-oxime of cortisol-21-acetate (E-8c) which may be converted to 11-18-hemiacetal of cortisol-21-acetate (E-8d), as described above.

The hemiacetal prepared from the 18-oxime of cortisol acetate has enhanced anti-inflammatory activity with respect to its parent compound, is an anti-anabolic agent, is useful in the treatment of collagen diseases, rheumatoid arthritis and asthma, *Lupus erythematosis* and various skin dermatoses, atopic dermatitis and pemphigus.

(E-8c)

(E-8d)

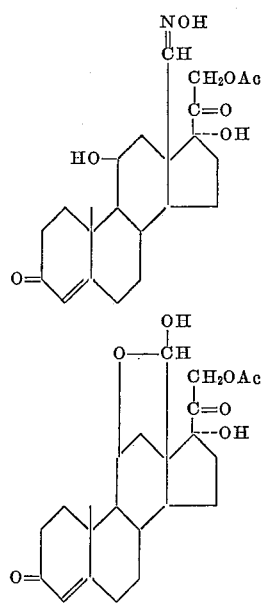

*Photolysis Example E-9*

Corticosterone acetate 11β-nitrite (E-9b) may be converted into aldosterone by photolysis and subsequent chemical treatment, as follows:

Corticosterone 11β-nitrite 21-acetate in dry toluene (3% concentration) is irradiated under the conditions set forth above in connection with Example E-1, at about 40° C. After about 20 minutes separation of a solid begins and this separation seems to be complete after about 40 to 60 minutes. The crystalline solid is removed by filtration and is the 18-oximino-11β,21-dihydroxy-pregn-4-ene-3,20-dione 21-acetate. It is added at about 10° C. to 5 to 10 times its weight of glacial acetic acid, after which there is added about 3 to 5 times its weight of a 5% aqueous solution of sodium nitrite. The mixture effervesces and the oxime is rapidly dissolved. The solution is tehn allowed to warm to room temperature, is then diluted with water, made slightly alkaline with sodium bicarbonate, and is then extracted with methylene chloride. The extract is then dried with sodium sulfate and is evaporated to give a colorless gum which may be crystallized from ethyl acetate to give aldosterone 21-acetate (E-9d) which if desired may be converted to aldosterone (E-9c).

(E-9c) 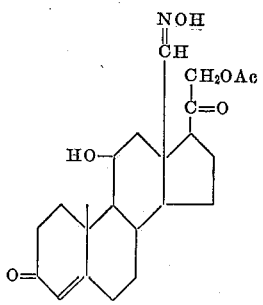

(E-9d) 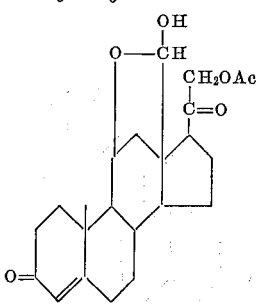

(E-9e)

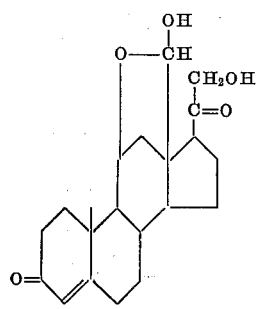

Aldosterone, as is known, may be used in the treatment of Addison's disease, and other disorders involving adrenal insufficiency.

*Photolysis Example E-10*

The 11β-nitrite ester of corticosterone 21-acetate resulting from the reaction of the steroid with nitrosyl bromide may be subjected to the identical reactions specified in Example E-9, with the production of an identical product.

*Photolysis Example E-11*

The 11β-nitrite ester of 16α-acetoxycorticosterone 21-acetate (E-11b) is photolysed under the conditions specified in Example E-1, and yields the 18-oxime, which may be chemically converted into the 11-18 hemiacetal of 16α-acetoxycorticosterone 21-acetate (E-11d).

This resulting compound is useful as an aldosterone antagonist, and promotes a diuresis loss of both sodium and water.

(E-11c)

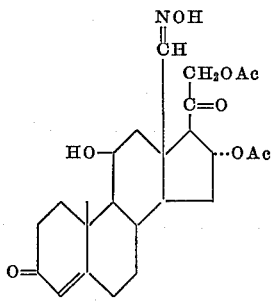

(E-11d)

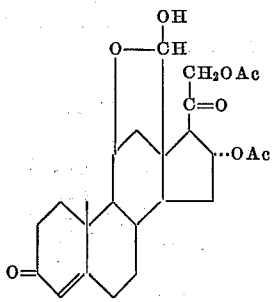

*Photolysis Examples E-12, E-13, E-14, E-15 and E-16*

Under procedures which are identical to those specified for Example E-11, other derivatives of corticosterone acetate-11β-nitrites may be converted into their corresponding hemiacetals, all of which are useful in much the same fields as the 11-18 hemiacetal of 16α-acetoxycorticosterone 21-acetate (E-11d), exhibiting properties as aldosterone antagonists and promoting diuresis loss of both sodium and water.

Thus by photolysis and subsequent treatment with nitrous acid:

E-12: 16α-methylcorticosterone acetate 11β-nitrate (E-12b) is converted to 18-oximino-16α-methylcorticosterone-11β-nitrite (E-12c) which may then be converted to the 11-18 hemiacetal of 16α-methylcorticosterone 21-acetate (E-12d).

E-13: 16β-methylcorticosterone acetate 11β-nitrite (E-13b) is converted to 18-oximino-16β-methylcorticosterone-11β-nitrite (E-13c) which may then be converted to the 11-18 hemiacetal of 16β-methylcorticosterone 21-acetate (E-13d).

E-14: 16α-acetoxy-1-dehydrocorticosterone acetate 11β-nitrite (E-14b) yields the 18-oximino compound (E-14c) and finally the 11-18 hemiacetal (E-14d).

E-15: 16α-methyl-1-dehydrocorticosterone-21-acetate 11β-nitrite (E-15b) yields the 18-oximino compound (E-15c) and finally the 11-18 hemiacetal (E-15d).

E-16: 16β-methyl-1-dehydrocorticosterone-21-acetate 11β-nitrite (E-16b) yields the 18-oximino compound (E-16c) and finally the 11-18 hemiacetal (E-16d).

(E-12c)

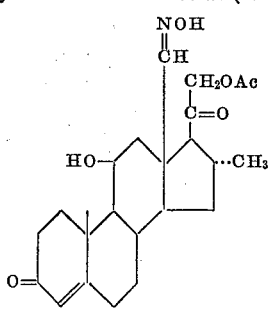

(E-12d)

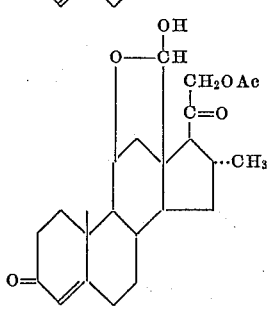

(E-13c)

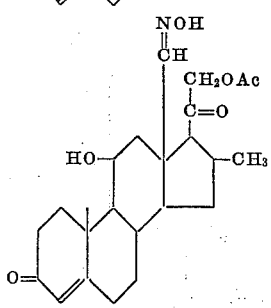

(E-13d)

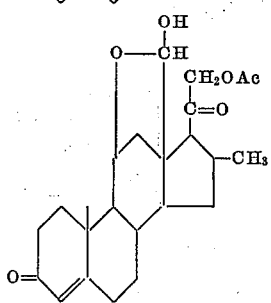

(E-14c)

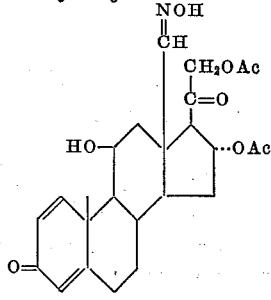

(E-14d) 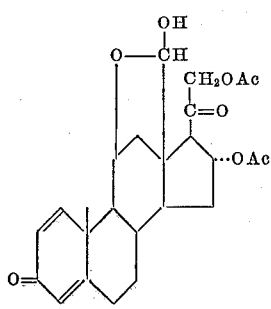

(E-15c) 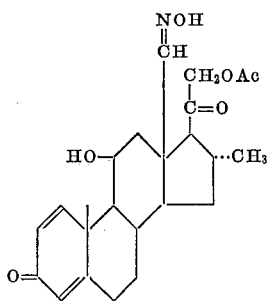

(E-15d) 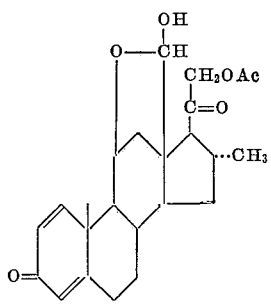

(E-16c) 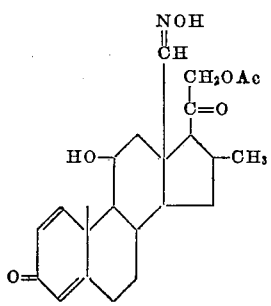

(E-16d) 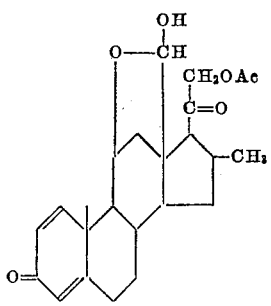

*Photolysis Example E-17*

Pregnane - 3α,17α,20β - triol - 3,20 - diacetate - 11β-nitrite (E-17b) when subjected to the photolysis as set forth in Example E-1, yields the corresponding 18-oxime (E-17c) which, by treatment with glacial acetic acid and aqueous sodium nitrite yields the corresponding 11-18 hemiacetal; pregnane - 3α,17α,20β - triol - 3,20 - diacetate-11-18 hemiacetal (E-17d).

This compound (E-17d) is useful when intramuscularly administered as a therapeutic agent, as a pyrogenic agent and as an adjunct in the treatment of tertiary syphilis.

(E-17c) 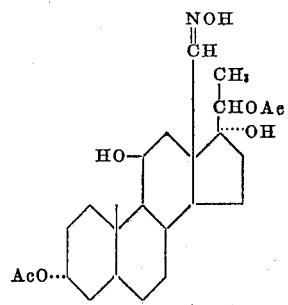

(E-17d) 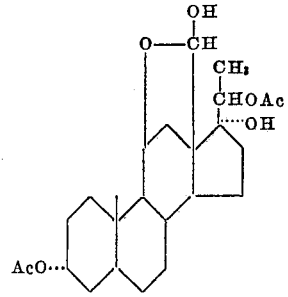

*Photolysis Example E-18*

The 11β-nitrite ester of prednisolone acetate (E-18b) may be photolysed in the manner set forth above to yield the corresponding 18-oxime (E-18c), which may then be treated with nitrous acid while in acetic acid solution to form the 11-18 hemiacetal (E-18d), which is useful in much the same manner as its parent compound, prednisolone, and is somewhat more active than cortisol acetate.

The 18-oxime (E-18c) may be converted to the corresponding lactone (E-18e) by treatment of the oxime in acetone solution with chromic acid acetone solution. The lactone (E-18e) is then purified by recrystallization and yields a product which is a natriuretic agent leading to the loss of sodium in the human body and which also promotes osmotic diuresis.

(E-18c) 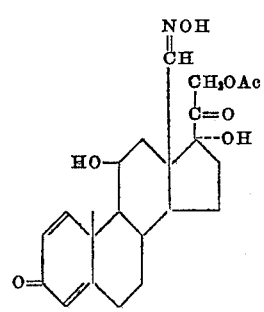

(E-18d) 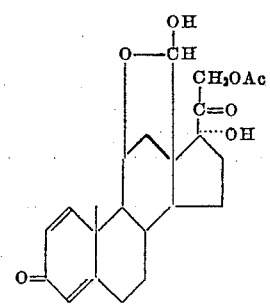

(E18-e)

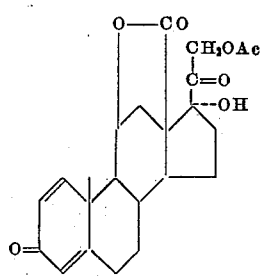

*Photolysis Example E-20*

The 11β-nitrite ester of 17α-acetoxyprogesterone (E-20b) is photolysed under the conditions set forth above and yields the corresponding 18-oxime (E-20c) and thence to the hemiacetal (E-20d) or to the lactone (E-20e) by the reactions set forth above.

The hemiacetal is useful by reason of its enhanced progestational activity, which induces the secretory phase of endometrial proliferation, and may be used in the treatment of menstrual disorders, such as dysmenorrhea. It is also active topically against various dermatological diseases, such as topic dermatitis, excema and contact dermatitis.

The lactone (E-20e) is useful in inhibiting renal tubular reabsorption of sodium in the human system.

(E-20c)

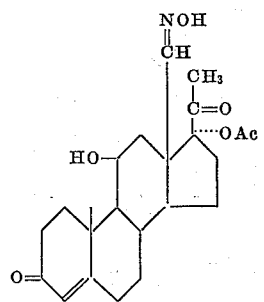

(E-20d)

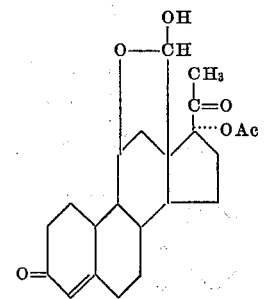

(E-20e)

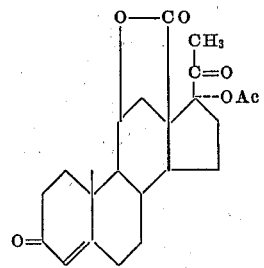

*Photolysis Example E-21*

The lactone and nitrile which may be produced from the photolysis product of the 11β-nitrite ester of progesterone are useful for substantially the same results as described above in connection with the lacetone (E-20e).

The nitrite ester (E-21b) subjected to ultraviolet photolysis in toluene solution, as described in detail above, forms the oxime (E-21c), which may be converted to the lacetone (E-21d) in accordance with the steps set forth above in connection with Photolysis Example 18, or may be converted into the nitrile (E-21e) by treatment with thionylchloride in pyridine solution.

(E-21c)

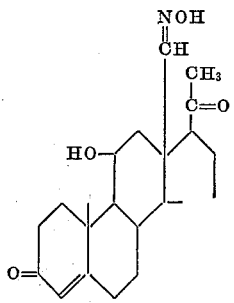

(E-21d)

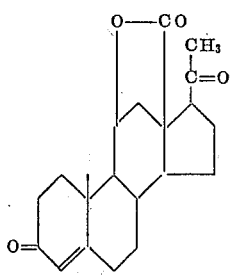

(E-21e)

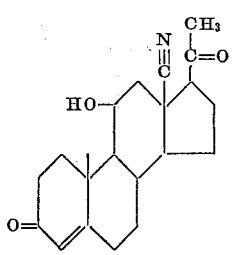

*Photolysis Example E-22*

The 11–18 hemiacetal of 16α-acetoxy-prednisolone-21-acetate is very similar in its therapeutic properties to the hemiacetal of Photolysis Example 18, and may be produced by the same procedural steps as have been described in connection with Photolysis Example E-1. As shown in the appended formulae, the oxime (E-22d) may be converted into the hemiacetal (E-22e) of 16α-acetoxy-prednisolone-21-acetate.

(E-22d)

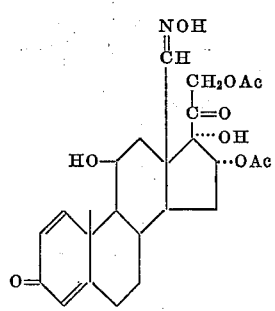

(E-22e)

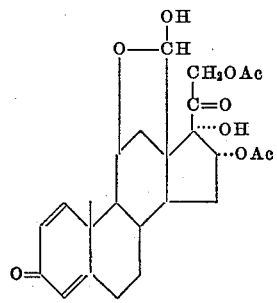

Photolysis Example E–23

In an exactly similar manner to that for Example 22, the nitrite resulting from Preparation No. 23 may be converted to the photolytically produced oxime (E–23c) to the corresponding hemiacetal (E–23d), which exhibits substantially the same therapeutic properties as the hemiacetal of the preceding example (E–22e).

(E–23c)

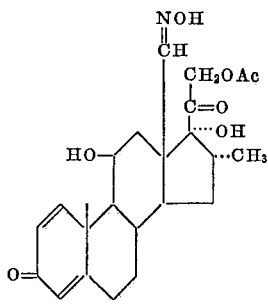

(E–23d)

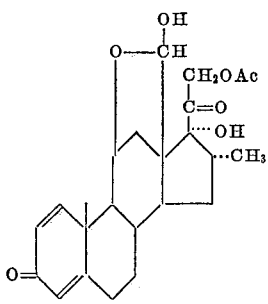

Photolysis Example E–24

The 11–18 lactone of 16β-methyl prednisolone acetate (E–24d) results from the photolysis of the nitrite (E–24b) followed by treatment of the resulting oxime (E–24c) with nitrous acid to yield the hemiacetal which may be converted to the lactone by oxidation with chromic acid in acetone. This lactone is a nateuretic agent which induces the loss of sodium in the human body and promotes osmotic diuresis.

(E–24c)

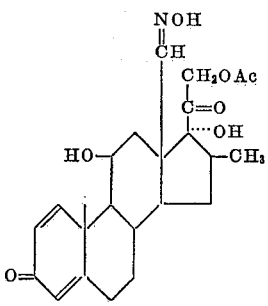

(E–24d)

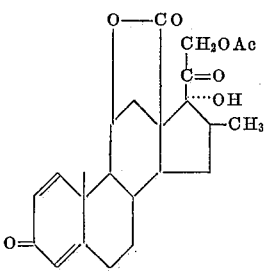

Photolysis Example E–25

Subjecting the 11β-nitrite ester of dexamethasone 21-acetate (E–25b) to photolysis in toluene solution, under the conditions which have been set forth above, yields the 18-oxime (E–25c) which may be converted to the hemiacetal (E–25d) in accordance with the precedure set forth in Photolysis Example E–1. This hemiacetal is another nateuretic agent promoting osmotic diuresis and is somewhat more effective in this regard than the 11–18-hemiacetal of prednisolone acetate (E–18d).

(E–25c)

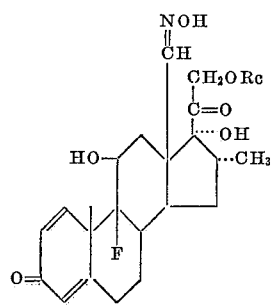

(E–25d)

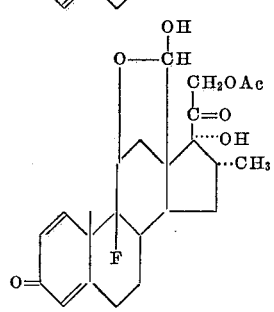

Photolysis Example E–26

In exactly the same manner as in Photolysis Example 25, the nitrite ester of Δ$^{1,4}$-pregnadiene-3,20-dione-9α-fluoro - 11β - hydroxy - 16β - methyl - 17α - hydroxy - 21-acetate (E–26b) yields the 18-oxime (E–26c) and the 11–18 hemiacetal (E–26d), which has substantially the same properties as the hemiacetal (E–25d).

(E–26c)

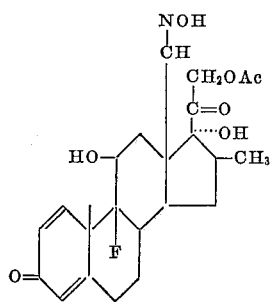

(E–26d)

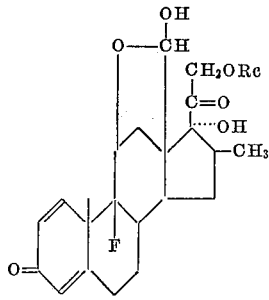

Photolysis Example E–27

Photolysis, under the conditions recited above, of the 11β-nitrite ester of pregnane-3α,11β,20β-triol-3,20-diacetate (E–27b) yields the corresponding 18-oxime (E–27c) which may be converted to the hemiacetal (E–27d) by treatment with nitrous acid. This hemiacetal is useful as a pyrogen, especially as an adjunct in the treatment of tertiary syphilis.

(E-27c)
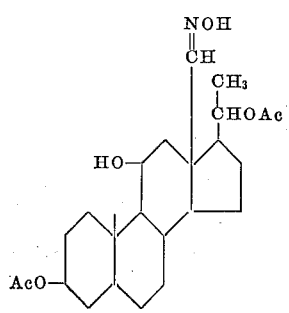

(E-27d)
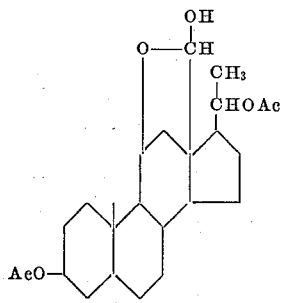

*Photolysis Example E-28*

Cholestanol-3-acetate-11β-nitrite (E-28b) irradiated in toluene solution by ultraviolet light at a temperature of about 30° C. for an hour while being stirred by bubbling nitrogen through the solution. The resulting compound is the 18-oxime (E-28c) which is separated by chromatography in a column filled with Florosil, successively eluted with ether-benzene mixtures containing increasing amounts of ether. The solvent fractions containing the 18-oxime may be evaporated to yield crystals of the oxime which may be further purified by recrystallization from ethyl acetate.

The purified oxime (E-28c) may then be converted to the corresponding hemiacetal (E-28d) by dissolving it in glacial acetic acid, followed by the addition of aqueous sodium nitrite. The resulting white crystals may then be filtered off and purified by recrystallization from methanol.

The hemiacetal (E-28d) is therapeutically useful in lowering serum cholesterol and in the treatment of arteriosclerotic diseases.

(E-28c)
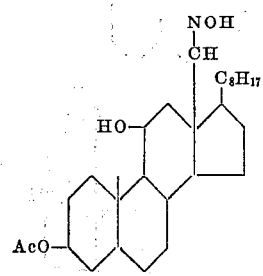

(E-28d)
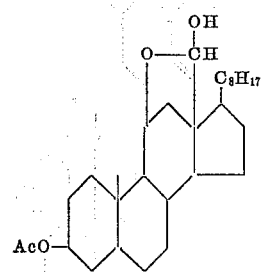

*Photolysis Example E-29*

Under the conditions specified in Example E-1, photolysis of the 11β-nitrite of cortisol acetate oxide (E-29b) yields the corresponding 19-oxime which is readily converted to the 19-aldehyde (E-29d) by treatment with chromous chloride followed by nitrous acid. The 19-aldehydocortisol acetate (E-29d) exhibits therapeutic properties as an anti-inflammatory agent in rheumatic arthritis producing diminished tubular reabsorption of sodium.

(E-29c)
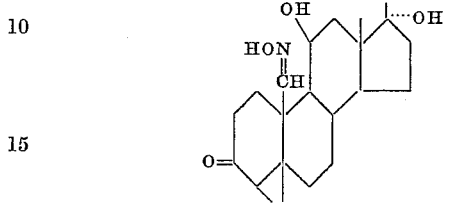

(E-29d)
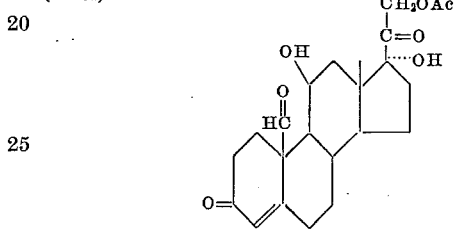

*Photolysis Example E-30*

The nitrite ester of 11β-hydroxy-4,5-oxido androstane-3,17-dione when subjected to photolysis in toluene as specified above, yields the 19-oxime (E-30c) which, on treatment with nitrous acid is converted to the 19-aldehyde (E-30d). Treatment of the 19-aldehyde with chromous chloride introduces a double bond at the -4,5-position giving an equilibrium mixture of the two compounds E-30e and E-30f. The compound E-30f is Δ⁴-androsten-3,17-dione-11,19-hemiacetal which is useful as an aldosterone inhibitor and diuretic.

(E-30c)
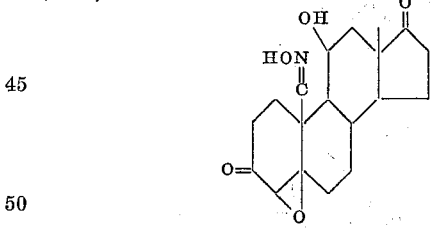

(E-30d)
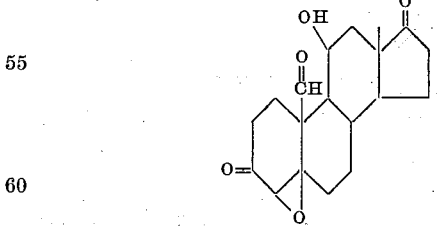

(E-30e)      (E-30f)
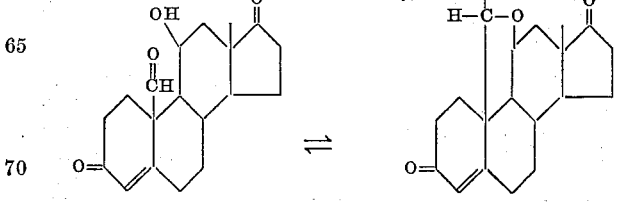

*Photolysis Example E-31*

4,5 - oxidodihydrocorticosterone acetate 11β - nitrite (E-31b) on photolysis in toluene yields the corresponding 19-oxime (E–31c) which on treatment with nitrous acid is converted to an equilibrium mixture of the corresponding 19-aldehyde (E–31d) and the 11–19 hemiacetal (E–31e). On further treatment with chromous chloride, the oxygen linked to the -4,5-positions is replaced by a double bond and the product is corticosterone acetate -11–19 hemiacetal (E–31f) which may be used to increase the tubular reabsorption of sodium.

(E–31c)

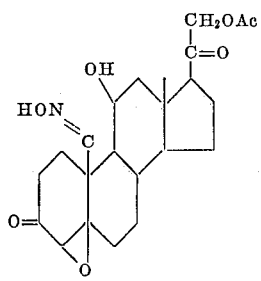

(E–31d)

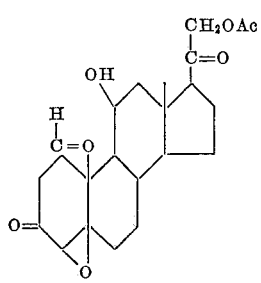

(E–31e)

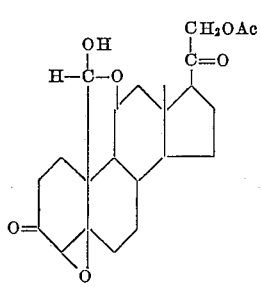

(E–31f)

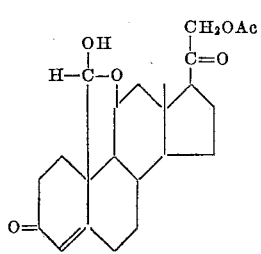

*Photolysis Example E–32*

The 20β-nitrite ester of 20β-hydroxy-Δ⁴-pregnen-3-one (E–32b) is dissolved in 500 ml. of dried benzene to form a 3% solution and is irradiated for 5½ hours with a 200 watt mercury lamp in an ice bath, while nitrogen is bubbled through the solution. The solvent is then removed by a stream of air at room temperature, and the highly colored residual oil is chromatographed on 600 g. of Florisil. Ether/benzene (5% of the former) removes a non-polar substance, behaving like progesterone in paper chromatograms. Later eluates (10% ether in benzene) consist in great part of the original 20β-hydroxy-Δ⁴-pregnen-3-one. Upon increasing the polarity of the developing solvent to 30% ether in benzene, the desired 18-oxime (E–32c) is isolated, and may be crystallized from ethyl acetate and later recrystallized from acetone.

The foregoing 18-oxime (E–32c) is dissolved in 30 ml. of acetone, is then cooled in ice and titrated under stirring with Kiliani solution (8 N—CrO₃/H₂SO₄) until a permanent brown color persists. The mixture is then stirred for another five minutes and then 200 ml. of water are added. The resulting precipitate is filtered, washed with water and recrystallized from ethyl acetate.

The lactone (E–32d) thus obtained may be recrystallized from ethyl acetate.

Lithium aluminum hydride (2.5 g.) is added to 100 ml. of tetrahydrofuran cooled in ice and the resulting suspension is allowed to stir for ½ hour. The foregoing lactone (1 g.), dissolved in 10 ml. of tetrahydrofuran, is then added dropwise and with stirring. The ice bath is removed, and the suspension is allowed to reflux for one hour. It is then cooled, and excess reagent destroyed carefully with ethyl acetate. The complex is destroyed by the addition of a saturated solution of sodium sulfate. When the precipitate starts to clump, dry sodium sulfate is added, and the mixture is filtered. The filter cake is washed with more tetrahydrofuran, and the combined organic solution may be concentrated to dryness. The residual triol (E–32e) is then dissolved in 75 ml. of chloroform, 10 g. of active manganese dioxide is added and the suspension is stirred vigorously at room temperature overnight. Filtration and vacuum concentration of the chloroform solution produces a residue that may be recrystallized from ethyl acetate to give 18,20β-dihydroxy-Δ⁴-pregnen-3-one (E–32f).

(E–32c)

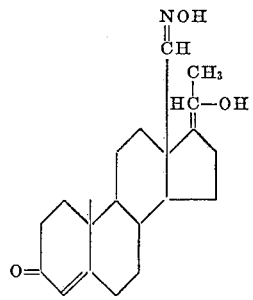

(E–32d)

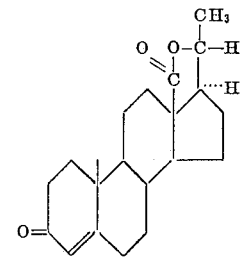

(E–32e)

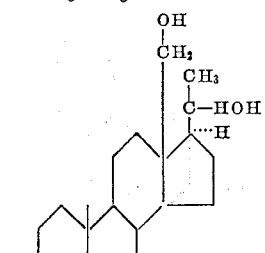

(E–32f)

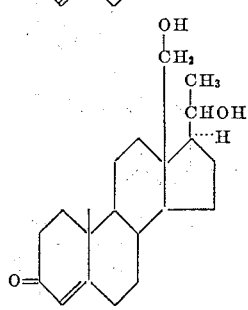

Photolysis Example E–33

Strophanthidol-3-acetate-19-nitrite (E–33b) is photolyzed in toluene solution to yield the 11-oxime (E–33c) which may be separated by chromatography or by recrystallization. The 11-oxime (E–33c) is then converted to the 11-keto compound (E–33d) by treatment with nitrous acid.

The 11-keto derivative of strophanthidol-3-acetate exhibits enhanced digitalis activity with respect to the parent compound, and also promotes diuresis.

(E–33c)

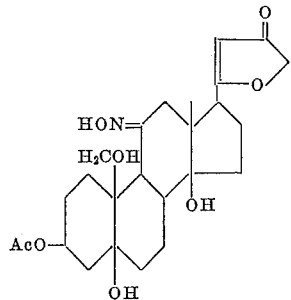

(E–33d)

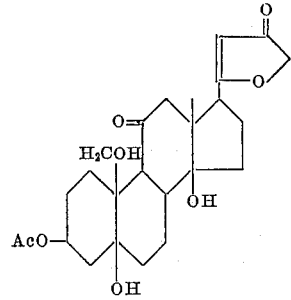

(E34–e)

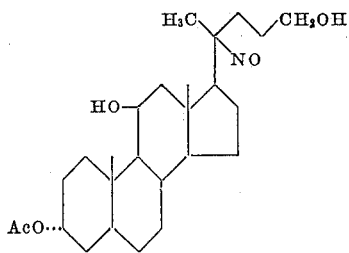

Photolysis Example E–34

The 24 nitrite ester of 3α-acetoxy-11β,24-dihydroxycholane (E–34d) is photolyzed in toluene to yield the corresponding 20-nitroso compound (E–34e) which is reduced by treatment with palladium in ethanol to yield the corresponding 20-amino derivative (E–34f). By further treatment with nitrous acid, and then by further treatment with chromic oxide-sulfuric acid reagent there is produced 3α-acetoxy-11,20-diketopregnane (E–34g) which is an intermediate for the production of cortisone.

(E–34f)

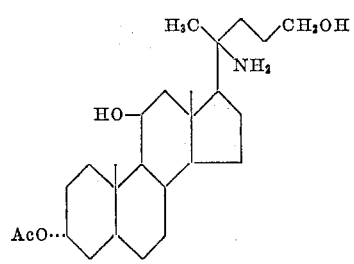

(E–34g)

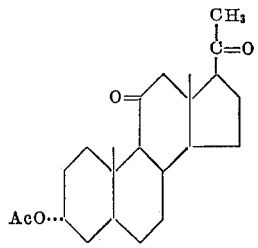

Photolysis Example E–35

The 6β-nitrite ester (E–35d) on photolysis in toluene yields the 19-oxime (E–35e) which by treatment with sodium nitrite and acetic acid yields the corresponding 6–19 hemiacetal (E–35f) which may be recrystallized from methanol-acetonitrile.

This 6–19 hemiacetal is a pyrogenic agent and is useful as an adjunct in the treatment of tertiary syphilis.

(E–35e)

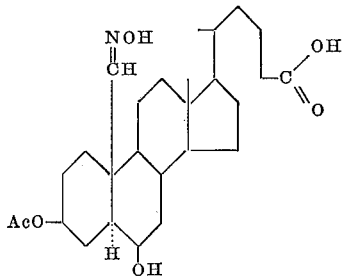

(E–35f)

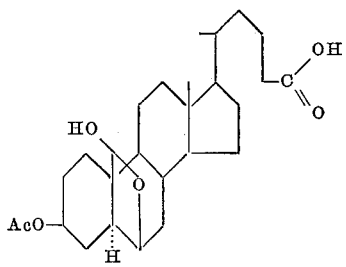

Photolysis Example E–36

The 6β-nitrite ester (E–36d) derived from nor-cholesterol (E–36a) on photolysis in toluene yields the corresponding 19-oxime (E–36e) which on being subjected to a Wolff-Kischner reduction (hydrazine and alkali in ethylene glycol) followed by treatment with nitrous acid forms the hemiacetal (E–36f).

The hemiacetal (E–36f) is valuable in lowering serum cholesterol.

(E–36e)

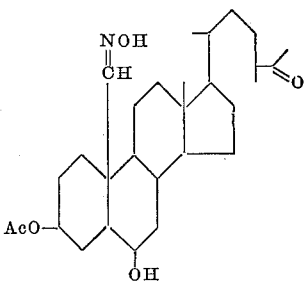

(E–36f)

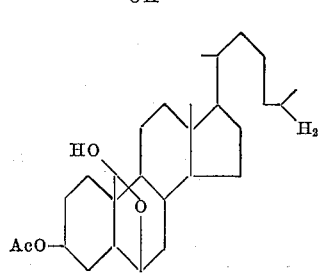

Photolysis Example E-37

The 6β-nitrite of 3β-acetoxycholestane (E-37b) is photolyzed as a 10% solution in toluene for a period of 4 hours. The solid 19-nitroso-dimer resulting is filtered and rinsed with acetone, and then refluxed in isopropyl alcohol.

The oxime E-37c thus produced is then treated with nitrous acid to yield the 6-19 hemiacetal (E-37d) which may be further treated with lithium aluminum hydride to form the 6β-19 diol (E-37e).

The diol so produced is also useful in reducing serum cholesterol.

(E-37c)
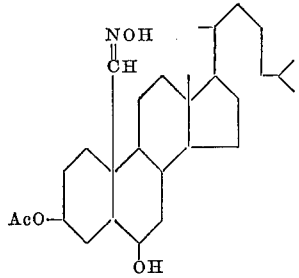

(E-37d)
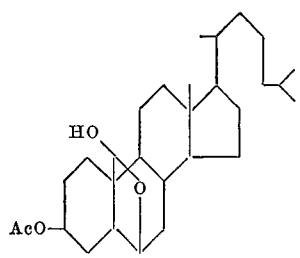

(E-37e)
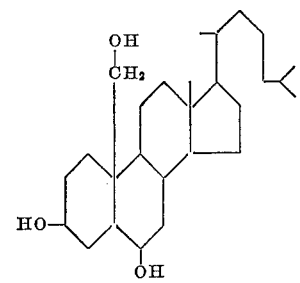

Photolysis Example 38

The 11β-nitrite (E-38b) derived from 11β-hydroxyergost 22-enolacetate (E-38a) is photolyzed under the conditions set forth above and yields the corresponding 19-oxime (E-38c) which on treatment with nitrous acid yields the 6-19 hemiacetal (E-38d).

(E-38c)
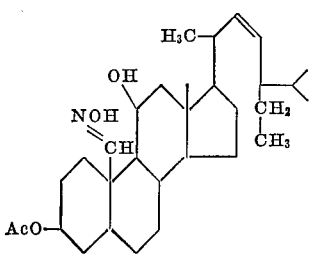

(E-38d)
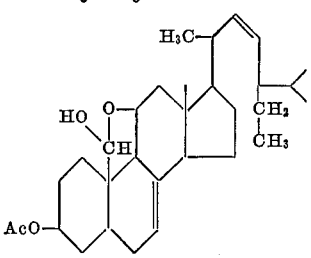

Photolysis Example E-39

In exactly the same manner as with photolysis Example 38 the 6β-nitrite ester from ergosterol (E-39d) yields the 19-oxime (E-39e) and the 6-19 hemiacetal (E-39f).

Both hemiacetals E-38d and E-39f are also useful in lowering the serum chloesterol.

(E-39e)
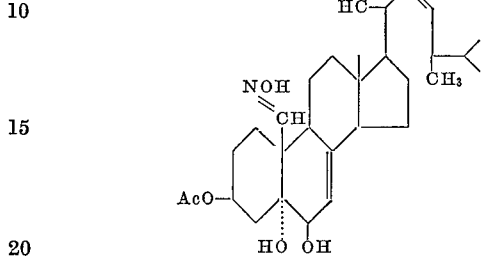

(E-39f)
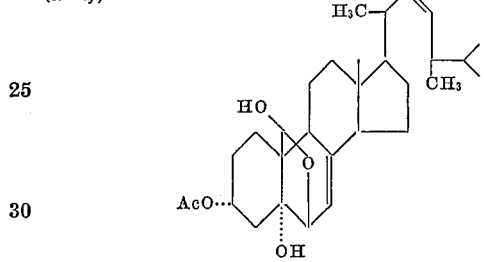

Photolysis Example E-40

The 6β-nitrite (E-40f) resulting from preparation No. 40 is photolyzed in toluene solution to yield the 19-oxime (E-40g). Treatment with thionyl chloride in pyridine solution yields the corresponding nitrile (E-40h) which on treatment with sodium hydroxide solution in water is deacetylated at the 3-position to yield the 3-hydroxy compound, which is then treated with chromic acid/sulfuric acid in acetone yielding the 3-keto-Δ⁴-derivative (E-40i) which may then be subjected to ozonizing giving the bisnorcholenaldehyde (E-40j). This aldehyde is reacted with acetic anhydride and sodium acetate to give a mixture of enol acetates then ozonized and hydrolysed with sodium hydroxide to give 19-nor progesterone, which is of known utility.

(E-40g)
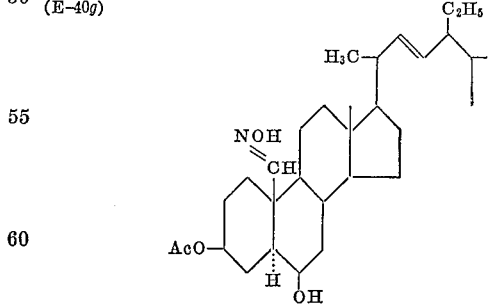

(E-40h)
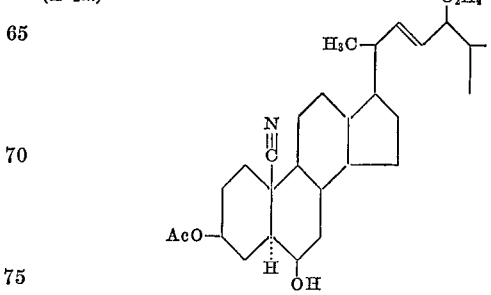

(E-40i)

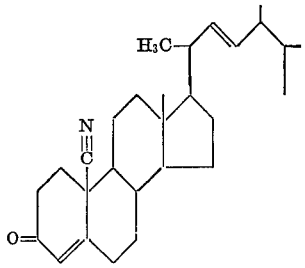

(E-40j)

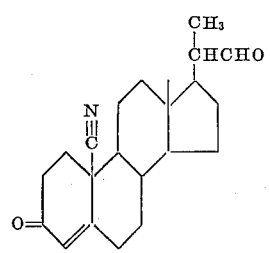

*Photolysis Example E-41*

The 2β-nitrite ester (E-41b) of 2β-hydroxy cholestanyl acetate on photolysis yields the 19-oxime (E-41c) and by nitrous acid treatment the 2-19 hemiacetal of cholestanyl acetate (E-41d) is produced.

(E-41c)

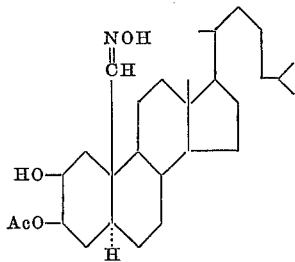

(E-41d)

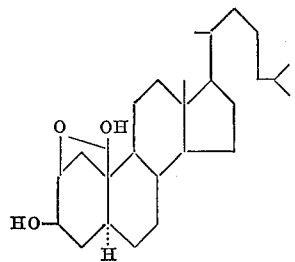

*Photolysis Examples E-42*

Under the same conditions as specified in Photolysis Example 41, the 4β-nitrite ester (E-42b) of 4β-hydroxy cholesteryl acetate yields the 19-oxime (E-42c) and by nitrous acid treatment the 4-19 hemiacetal of cholesteryl acetate (E-42d).

Both the 2-19 and the 4-19 hemiacetals are useful in the treatment of distemper, *Trichomonas columbiae*, *Trichomonas foetus* infection in cattle, and they also serve to inhibit growth and development of *Blatella germanica* L.

(E-42c)

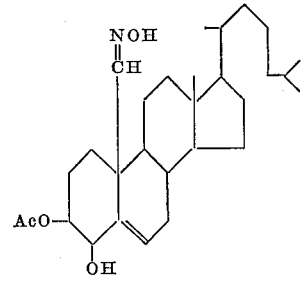

(E-42d)

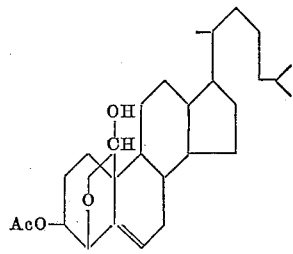

*Photolysis Examples E-43*

The 18-nitrite (E-43d) from isorubijervine (E-43a) on photolysis in toluene gives the 11-oxime (E-43e) which may be oxidized to the corresponding 11-keto compound (E-43f) by nitrous acid, or to the 11-amine (E-43g) by reduction with sodium-ethanol reagent.

(E-43e)

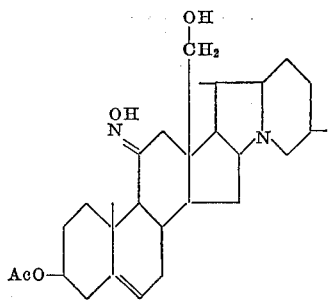

(E-43f)

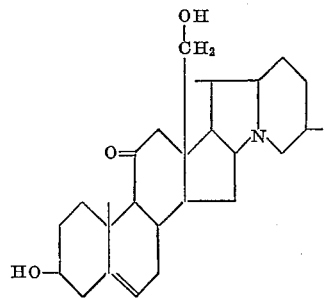

(E-43g)

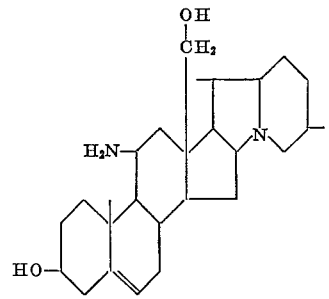

Both the 11-keto and 11-amine compounds show enhanced therapeutic properties, compared to their parent, in the treatment of hypertension.

In general, the oximes resulting from the photolysis of the nitrite esters may be purified by chromatography, on a Florosil column which is then successively eluted with mixed solvents, such as methylene chloride containing increasing amounts of acetone, or with acetone containing increasing amounts of methanol, in the conventional manner.

The invention in its broader aspects is not limited to the specific steps, processes and compositions shown and described but departures may be made therefrom within the scope of the accompanying claims without departing from the principles of the invention and without sacrificing its chief advantages.

I claim:

1. A steroid nitrite ester having 18 to 29 carbon atoms in the steroid moiety thereof, the nitrite radical of said nitrite ester being conformationally adjacent to a hydrogen atom, there being a 2-carbon bridge between the respective carbon atoms bearing the nitrite ester and the conformationally adjacent hydrogen atom, said nitrite ester being in a position selected from the group consisting of 1β,2β,4β,6β,7β,11,15α,18,19,20 and 24; said steroid nitrite ester being further characterized in that upon irradiation with ultraviolet light, the nitrite radical undergoes photolytic exchange of position with the aforesaid conformationally adjacent hydrogen atom.

2. Prednisolone 11-nitrite 21-acetate.
3. 16-methylprednisolone 11-nitrite 21-acetate.
4. Hydrocortisone 11-nitrite 21-acetate.
5. 9α-fluoro-16-methylprednisolone 11-nitrite 21-acetate.
6. 1,4-pregnadiene-11β,16α,17α,21-tetrol-3,20-dione 11-nitrite 16,21-diacetate.
7. 4-pregnene-11β,21-diol-3,20-dione 11-nitrite 21-acetate.
8. 4-pregnene-11β,16α,21-triol-3,20-dione 11-nitrite 16,21-diacetate.
9. 16-methyl-1,4-pregnadiene-11β,21-diol - 3,20 - dione 11-nitrite 21-acetate.
10. 4-pregnene-11β,17α-diol-20-one 11-nitrite 17-acetate.
11. 11β-hydroxyestradiol-3,17-diacetate 11-nitrite.
12. 11β-hydroxytestosterone 11-nitrite 17-acetate.
13. 11β-hydroxy-17α-methyltestosterone 11-nitrite 17-acetate.
14. Androstane-3,11β-diol-17-one 3-acetate 11-nitrite.
15. Pregnane-3β,6β,21-triol-20-one 3,21-diacetate 6-nitrite.
16. 4-pregnene-20β-ol-3-one 20-nitrite.

References Cited by the Examiner
UNITED STATES PATENTS

| | | | |
|---|---|---|---|
| 2,674,606 | 4/54 | Levin et al. | 260—397.45 |
| 2,773,080 | 12/56 | Bernstein et al. | 260—397.45 |
| 2,818,380 | 12/57 | Welz | 204—158 |
| 2,885,333 | 5/59 | Mueller et al. | 204—158 |

LEWIS GOTTS, *Primary Examiner.*
LESLIE H. GASTON, *Examiner.*